United States Patent
Iwasaki et al.

(10) Patent No.: US 7,159,559 B2
(45) Date of Patent: Jan. 9, 2007

(54) SPLIT CONNECTING ROD, ENGINE AND VEHICLE

(75) Inventors: Shinya Iwasaki, Shizuoka (JP); Tsuneo Isobe, Shizuoka (JP); Tsuyoshi Kubota, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 146 days.

(21) Appl. No.: 11/000,561

(22) Filed: Dec. 1, 2004

(65) Prior Publication Data

US 2005/0126533 A1 Jun. 16, 2005

(30) Foreign Application Priority Data

Dec. 2, 2003 (JP) .............................. 2003-403746

(51) Int. Cl.
*F16C 7/02* (2006.01)

(52) U.S. Cl. ............................... 123/197.3; 29/888.091

(58) Field of Classification Search ............. 29/888.09, 29/888.091, 413, 414; 123/197.3; 74/579 R
See application file for complete search history.

(56) References Cited

U.S. PATENT DOCUMENTS

| | | | |
|---|---|---|---|
| 4,569,109 A | 2/1986 | Fetouh | |
| 4,860,419 A * | 8/1989 | Hekman | ................... 29/888.09 |
| 4,884,900 A | 12/1989 | Pirault et al. | |
| 5,207,084 A * | 5/1993 | West et al. | .................... 72/325 |
| 5,507,093 A | 4/1996 | Wittenstein et al. | |
| 5,536,089 A * | 7/1996 | Weber et al. | ................ 384/294 |
| 5,551,782 A * | 9/1996 | Arnhold et al. | ............. 384/294 |
| 5,974,663 A | 11/1999 | Ikeda et al. | |
| 6,134,779 A * | 10/2000 | Walker et al. | ......... 29/888.092 |
| 6,312,159 B1 | 11/2001 | Ishida et al. | |
| 6,357,321 B1 | 3/2002 | Schmitt | |
| 6,474,526 B1 | 11/2002 | Hähnel et al. | |
| 6,502,480 B1* | 1/2003 | Walker et al. | ............. 74/579 E |
| 6,655,026 B1* | 12/2003 | Iida et al. | ................. 29/888.09 |
| 6,961,997 B1* | 11/2005 | Kubota et al. | ........... 29/888.09 |

FOREIGN PATENT DOCUMENTS

| | | |
|---|---|---|
| EP | 1 243 665 A1 | 9/2002 |
| JP | 58-21017 | 2/1983 |
| JP | 2000-002231 | 1/2000 |
| JP | 2001-512050 | 8/2001 |
| WO | WO 2004/007980 | 1/2004 |

* cited by examiner

*Primary Examiner*—Marguerite McMahon
(74) *Attorney, Agent, or Firm*—Keating & Bennett, LLP

(57) ABSTRACT

A split connecting rod includes a fracture start groove that extends in an axial direction X and is located at the approximate center of each of opposing positions on an inner surface of a crank pin opening. A bearing securing groove is provided on either or both of the opposing positions on the inner surface of the crank pin opening. Notches are provided, respectively, at both ends of each of the opposing positions in the axial direction X on the inner surface of the crank pin opening. The fracture start groove has a stress concentration factor that is greater than those of the notches and the bearing securing groove. Preferably, steel for use as the material of a connecting rod has a carbon content of about 0.05% to about 0.45% by weight, more preferably about 0.10% to about 0.35% by weight.

14 Claims, 19 Drawing Sheets

FIG. 3a
FIG. 3b
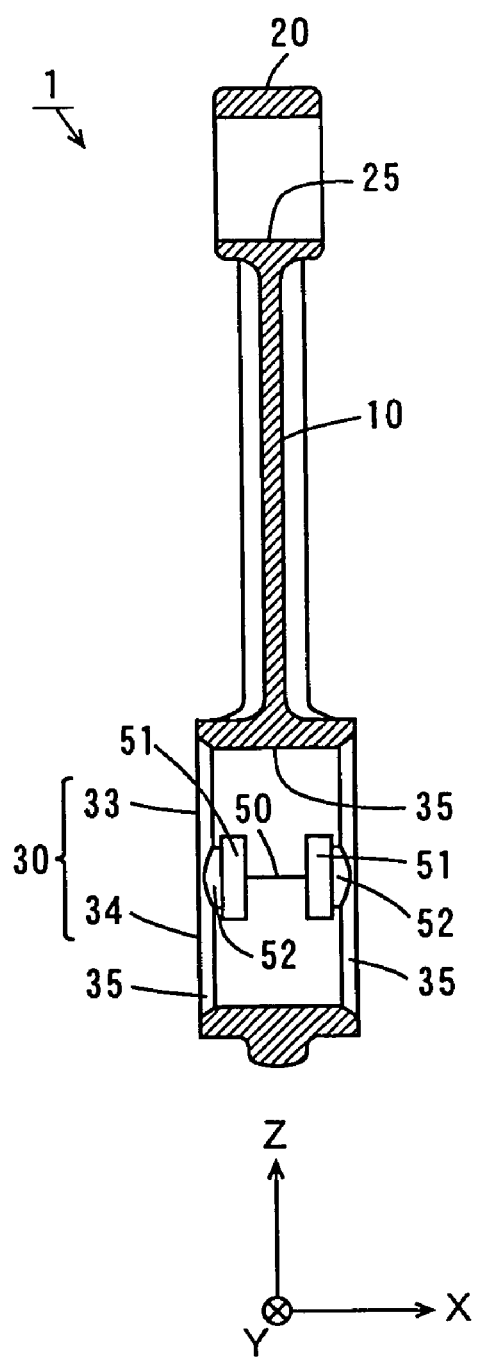
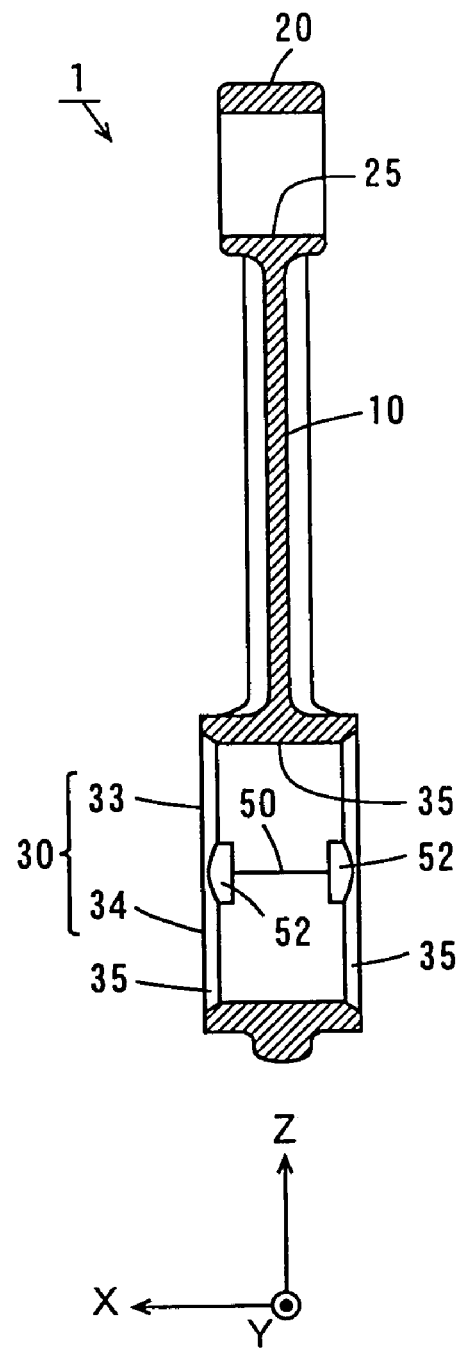

F I G. 17 a
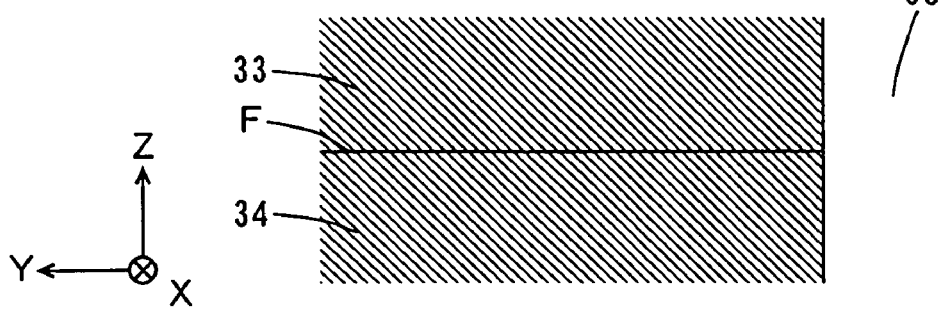
F I G. 17 b
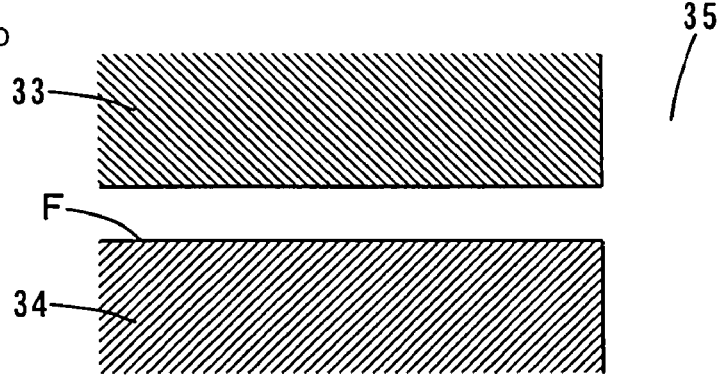
F I G. 17 c
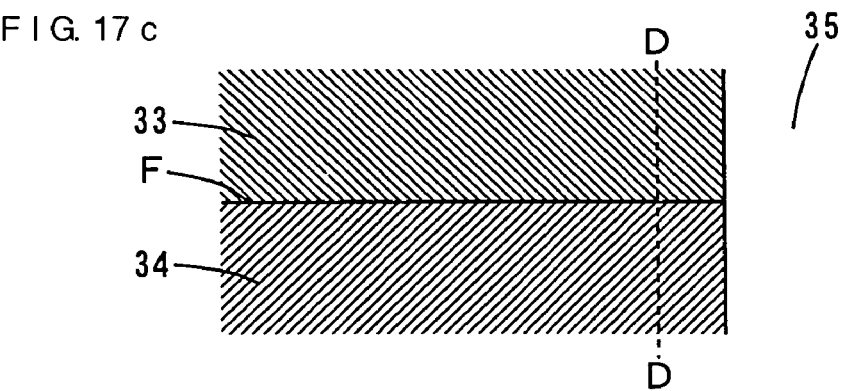
F I G. 17 d
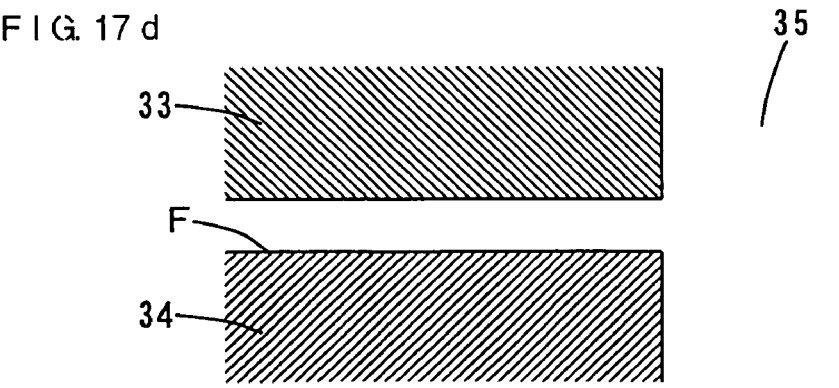

F I G. 2 0
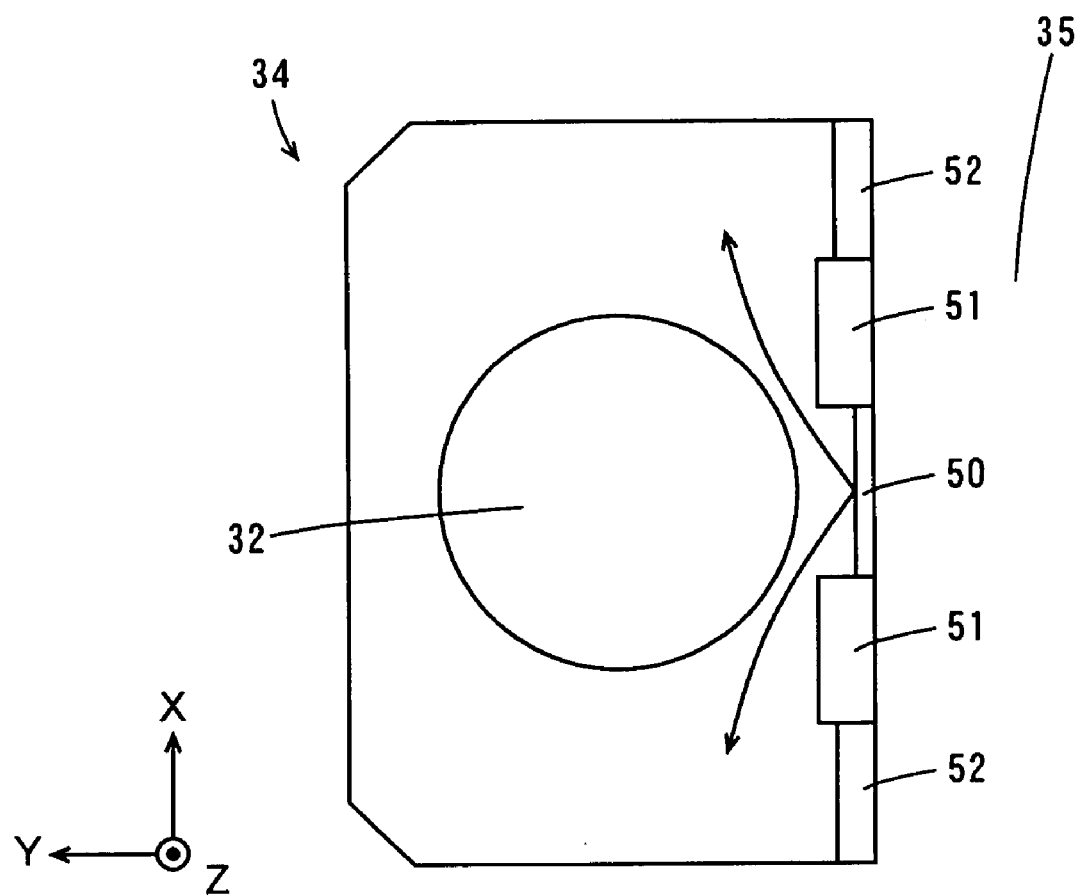

SPLIT CONNECTING ROD, ENGINE AND VEHICLE

BACKGROUND OF THE INVENTION

1. Field of the Invention

The present invention relates to a split connecting rod that joins a piston pin and a crank pin, an engine including such a split connecting rod, and a vehicle including such an engine and split connecting rod.

2. Description of the Background Art

An engine for a car, motorcycle or other motorized vehicle uses a connecting rod that joins a piston pin and a crank pin. The connecting rod has a small end for rotatably holding a piston pin at one end of a rod body, and a large end for rotatably holding a crank pin at another end thereof. A piston pin opening into which the piston pin is inserted is formed in the small end, and a crank pin opening into which the crank pin is inserted is formed in the large end.

A split connecting rod has its large end split in advance between a cap and a rod along a split plane including the axial center of the crank pin opening. The large end with the crank pin opening is formed by joining the rod and the cap with bolts.

Such a split connecting rod requires accurate positioning of the cap and the rod upon assembly into a crankshaft, in order to maintain the crank pin opening of the large end in the shape of a perfect circle and cylinder.

Among attempted solutions for improving the positioning accuracy is a fracture technique. The fracture technique involves the integral formation of a large end, and subsequent fracture separation of the large end into a rod and a cap. Since the fracture planes of the rod and the fracture planes of the cap have fine irregularities, accurate positioning of the rod and the cap is achieved by mating the fracture planes of the rod and the cap.

U.S. Pat. No. 4,569,109 proposed the formation of fracture start grooves that extend linearly in the axial direction on the inner surface of a crank pin opening, in order to induce a fracture prior to the fracture separation of a large end into a rod and a cap.

According to the above-described fracture technique, the shape of fracture planes affects the accuracy of positioning the rod and the cap. In the presence of a plurality of fracture start points, in particular, different fracture planes may develop from the respective fracture start points. In this specification, the formation of different fracture planes will be called double cracking.

Joining of the respective ends of different fracture planes causes a difference in level at the junction portion, resulting in the formation of a sizable projection on the fracture planes. This projection causes a resultant crank pin opening to have a shape that is less than a perfect circle and cylinder upon assembly of the rod and the cap. Further, metal between different fracture planes may fall off as broken pieces, which can cause damage to the engine parts.

In recent years, a connecting rod having sufficient tolerance is needed for improving the tolerance of an engine. However, the use of a very tough material for a connecting rod to achieve improved tolerance often results in the formation of double cracks. For this reason, a carbon steel containing a large amount of carbon is usually used as the material of a connecting rod.

WO 99/06170 has proposed an apparatus for fracture separation for preventing the formation of such double cracks and broken pieces. The apparatus as disclosed in the above-mentioned patent document applies a load exclusively to one part of the inner surface of a crank pin opening of a large end before separation, to fracture and separate the large end with the load applied point as a start point.

The apparatus for fracture separation, however, has a complicated structure that requires precision in the jig used for the apparatus. This increases the equipment cost, while also presenting a burden of managing deterioration with time in the jig. As a result, the manufacturing cost of a split connecting rod is increased.

SUMMARY OF THE INVENTION

In order to overcome the problems described above, preferred embodiments of the present invention provide a low-cost, easy-to-manufacture, and high-precision split connecting rod, an engine including such a split connecting rod, and a vehicle including the engine and the split connecting rod.

A split connecting rod according to a preferred embodiment of the present invention includes a rod body, a small end, and a large end having an opening integrally provided at one end of the rod body, wherein a fracture start groove is formed on each of opposing positions on an inner surface of the opening and at one portion of a line extending along an axial direction of the opening such that the fracture start groove has a greater stress concentration factor than another portion of the line extending along the axial direction of the opening, the large end being separated by fracture separation along the fracture start groove.

In the manufacture of the split connecting rod, on each of the opposing positions on the inner surface of the opening, the fracture start groove is formed at the one portion of the line extending along the axial direction of the opening to have a greater stress concentration than the other portion of the line extending along the axial direction of the opening. The fracture separation of the large end occurs along each of the fracture start grooves.

The fracture then starts from a single point on each of the lines on the inner surface, advancing from each of the single points on the inner surface of the opening. This causes the large end to be separated by the fracture separation along single fracture planes, thereby preventing the formation of double cracks. This prevents the formation of a sizable projection on each of the fracture planes, and also prevents falling of a broken piece therefrom. The assembly of the separated portions of the large end thus results in a high degree of roundness and cylindricality while achieving a significant decrease in the percentage of defective products.

In addition, the large end of the split connecting rod can be separated by fracture separation using a simple jig without requiring the use of costly equipment. Therefore, the manufacturing cost of the split connecting rod is decreased. Furthermore, the use of a very tough material is possible and improves the tolerance of the split connecting rod.

The fracture start groove may be formed at an approximate center of each line along the axial direction on the inner surface of the opening.

In this case, a fracture plane is formed by the fracture separation from the approximate center of the inner surface of the opening. This causes the large end to be separated by the fracture separation along the single fracture planes, thereby preventing the formation of double cracks.

The fracture start groove may also be formed at one end of each line that extends along the axial direction on the inner surface of the opening.

In this case, a fracture plane is formed by the fracture separation from the one end of the inner surface of the opening. This causes the large end to be separated by the fracture separation along the single fracture planes, thereby preventing the formation of double cracks.

A notch having a curved bottom surface may be formed at a region intersecting with the other portion of each line that extends along the axial direction on the inner surface of the opening, such that the notch has a stress concentration factor that is smaller than that of the fracture start groove.

With the stress concentration factor of the notch being smaller than that of the fracture start groove, stress is concentrated at the fracture start groove, so that the stress concentration at the notch is alleviated and minimized. This results in the concentration of stress at the one portion of the line extending along the axial direction on the inner surface of the opening. The fracture thus advances from the single point on each of the opposing positions on the inner surface of the opening.

One or more bearing securing grooves having a curved bottom surface may be formed, respectively, at one or more regions intersecting with the other portion of the line extending along the axial direction on at least one of the opposing positions on the inner surface of the opening, such that the one or more bearing securing grooves has a stress concentration factor that is smaller than that of the fracture start groove.

With the stress concentration factor of the one or more bearing securing grooves being smaller than that of the fracture start grove, stress is concentrated at the fracture start groove, so that the stress concentration at the one or more bearing securing grooves is alleviated and minimized. This results in the concentration of stress at the one portion of the line that extends along the axial direction on the inner surface of the opening. The fracture thus advances from the single point on each of the opposing positions on the inner surface of the opening.

The one or more bearing securing grooves may include a first bearing securing groove and a second bearing securing groove, the fracture start groove being formed between the first bearing securing groove and the second bearing securing groove.

In this case, stress is concentrated at the fracture start groove between the first bearing securing groove and the second bearing securing groove, so that the stress concentration at the first and second bearing securing grooves is alleviated and minimized. This results in the concentration of stress at the one portion of the line extending along the axial direction on the inner surface of the opening. The fracture thus advances from the single point on each of the opposing positions on the inner surface of the opening.

The inside of the rod body and the large end are preferably made of a steel having a carbon content of not less than about 0.05 wt % and not more than about 0.45 wt %, such that a surface layer of the rod body and the large end has a carbon content that is higher than the inside thereof.

In this case, the inside of the rod body and large end has significantly increased toughness, while the surface layer of the rod body and large end has significantly increased hardness. This improves the tolerance of the split connecting rod.

A split connecting rod according to another preferred embodiment of the present invention includes a rod body, a small end, and a large end having an opening integrally provided at one end of the rod body, wherein an inside of the rod body and the large end is made of a steel having a carbon content of not less than about 0.05 wt % and not more than about 0.45 wt %, the large end includes a rod and a cap formed by fracture separation, and on each of fracture planes of the rod and the cap, there is no junction of fractures originating from a plurality of points between a center line that is substantially parallel with an axial direction of the opening.

In the split connecting rod, the rod body and the large end are preferably made of steel having a carbon content of not less than about 0.05 wt % and not more than about 0.45 wt %. This increases the toughness of the rod body and large end, thereby improving the tolerance of the split connecting rod.

The large end includes the rod and the cap, which are formed by fracture separation. On each of the fracture planes of the rod and the cap, there is no junction of fractures originating from the plurality of points between the center line that is substantially parallel with the axial direction of the opening.

This prevents the formation of double cracks near the opening. This accordingly prevents the formation of a sizable projection on each of the fracture planes, and prevents falling of a broken piece therefrom. The assembly of the separated portions of the large end thus results in a high degree of roundness and cylindricality, while also achieving a significant decrease in the percentage of defective pieces.

In addition, the large end of the split connecting rod can be separated by fracture separation using a simple jig without requiring the use of costly equipment. Therefore, the manufacturing cost of the split connecting rod is decreased.

A method of split connecting rod according to still another preferred embodiment of the present invention includes the steps of forming a connecting rod including a rod body, a small end, and a large end having an opening integrally provided at one end of the rod body, forming, on each of opposing positions on an inner surface of the opening, a fracture start groove at one portion of a line extending along the axial direction of the opening to have a greater stress concentration factor than another portion of the line extending along the axial direction of the opening, and separating the large end by fracture separation along the fracture start groove.

In the manufacturing method, the connecting rod including the rod body and the large end is formed first. Secondly, on each of the opposing positions on the inner surface of the opening, the fracture start groove is formed at the one portion of the line extending along the axial direction of the opening to have a greater stress concentration factor than the other portion. After this, the large end is separated by the fracture separation along the fracture start groove.

The fracture then starts from the single point on each of the lines on the inner surface, advancing from each of the single points on the inner surface of the opening. This causes the large end to be separated by the fracture separation along single fracture planes, thereby preventing the formation of double cracks. This accordingly prevents the formation of a sizable projection on each of the fracture planes, and prevents falling of a broken piece therefrom. The assembly of the separated portions of the large end thus results in a high degree of roundness and cylindricality, while also achieving a significant decrease in the percentage of defective products.

In addition, the large end of the split connecting rod can be separated by fracture separation using a simple jig without requiring the use of costly equipment. Therefore, the manufacturing cost of the split connecting rod is decreased. Furthermore, the use of a very tough material is possible and improves the tolerance of the split connecting rod.

The step of forming the fracture start groove may include the step of forming the fracture start groove at an approximate center of each line that extends along the axial direction on the inner surface of the opening.

In this case, a fracture plane is formed by the fracture separation from the approximate center of the inner surface of the opening. This causes the large end to be separated by the fracture separation along the single fracture planes, thereby preventing the formation of double cracks.

The step of forming the fracture start groove also may include the step of forming the fracture start groove at one end of each line that extends along the axial direction on the inner surface of the opening.

In this case, a fracture plane is formed by the fracture separation from the one end of the inner surface of the opening. This causes the large end to be separated by the fracture separation along the single fracture planes, thereby preventing the formation of double cracks.

The method of manufacturing a split connecting rod may further include the step of forming, prior to the step of separating the large end by fracture separation, a notch having a curved bottom surface at a region intersecting with the other portion of each line that extends along the axial direction on the inner surface of the opening, the notch having a stress concentration factor that is smaller than that of the fracture start groove.

With the stress concentration factor of the notch being smaller than that of the fracture start groove, stress is concentrated at the fracture start groove, so that the stress concentration at the notch is alleviated and minimized. This results in the concentration of stress at the one portion of the line that extends along the axial direction on the inner surface of the opening. The fracture thus advances from the single point on each of the opposing positions on the inner surface of the opening.

The method of manufacturing a split connecting rod may further include the step of forming, prior to the step of separating the large end by fracture separation, on at least one of the opposing positions on the inner surface of the opening, one or more bearing securing grooves having a curved bottom surface, respectively, at one or more regions intersecting with the other portion of the line that extends along the axial direction on the inner surface of the opening, the one or more bearing securing grooves having a stress concentration factor that is smaller than that of the fracture start groove.

With the stress concentration factor of the one or more bearing securing grooves being smaller than that of the fracture start grove, stress is concentrated at the fracture start groove, so that the stress concentration at the one or more bearing securing grooves is alleviated and minimized. This results in the concentration of stress at the one portion of the line that extends along the axial direction on the inner surface of the opening. The fracture thus advances from the single point on each of the opposing positions on the inner surface of the opening.

The step of forming the one or more bearing securing grooves may include the step of forming, on at least one of the opposing positions on the inner surface of the opening, first and second bearing securing grooves at first and second regions intersecting with the other portion of the line that extends along the axial direction on the inner surface of the opening, the step of forming the fracture start groove including the step of forming the fracture start groove between the first region and the second region.

In this case, stress is concentrated at the fracture start groove between the first bearing securing groove and the second bearing securing groove, so that the stress concentration at the first and second bearing securing grooves is alleviated and minimized. This results in the concentration of stress at the one portion of the line that extends along the axial direction on the inner surface of the opening. The fracture thus advances from the single point on the inner surface of the opening.

The step of forming the rod body and the large end may include the step of forming the rod body and the large end of a steel having a carbon content of not less than about 0.05 wt % and not more than about 0.45 wt %.

In this case, the inside of the rod body and large end has greatly increased toughness, which improves the tolerance of the split connecting rod.

The step of forming the rod body and the large end may further include the step of performing a surface hardening process so that a surface layer of the rod body and the large end has a carbon content that is greater than the inside thereof.

In this case, the inside of the rod body and large end has greatly increased toughness, while the surface layer of the rod body and large end has greatly increased hardness. This further improves the tolerance of the split connecting rod.

The step of forming the fracture start groove may include the step of forming the fracture start groove by a wire-cut electrical discharge machining.

In this case, simultaneous formation of fracture start grooves on the large ends of a plurality of connecting rods is possible. This improves the productivity.

An engine according to yet another preferred embodiment of the present invention includes a cylinder, a piston arranged to move in a reciprocating manner in the cylinder, a piston pin provided on the piston, a crankshaft arranged to rotate, a crank pin provided in the crankshaft, and a split connecting rod that joins the piston pin and the crank pin, wherein the split connecting rod includes a rod body, a large end integrally provided at a first end of the rod body, and having a first opening into which the crank pin is inserted, and a small end integrally provided at a second end of the rod body, and having a second opening into which the piston pin is inserted, a fracture start groove located on each of opposing positions on an inner surface of the first opening such that one portion of a line extending along an axial direction of the first opening has a greater stress concentration factor than another portion of the line extending along the axial direction of the first opening, and the large end being separated by fracture separation along the fracture start groove.

In the engine, the piston is reciprocatingly arranged in the cylinder. The piston pin is provided on the piston, and the crank pin is provided in the rotatable crankshaft. The piston pin and the crank pin are joined by the split connecting rod. The crank pin is inserted into the first opening of the large end of the split connecting rod, and the piston pin is inserted in the second opening of the small end.

In the manufacture of the split connecting rod, the large end is separated by the fracture separation along single fracture planes, which prevents the formation of double cracks. This prevents the formation of a sizable projection on each of the fracture planes, and prevents falling of a broken piece therefrom. The assembly of the separated portions of the large end thus results in a high degree of roundness and cylindricality, while achieving a significant decrease in the percentage of defective products.

In addition, the large end of the split connecting rod can be separated by fracture separation using a simple jig without requiring the use of costly equipment. Therefore, the manufacturing cost of the split connecting rod is decreased. Furthermore, the use of a very tough material is possible and improves the tolerance of the split connecting rod.

Since the first opening of the split connecting rod has a high degree of roundness and cylindricality, friction losses in the engine are decreased, while the seizing up of the engine is prevented. Moreover, the damage to the engine parts due to a broken piece is prevented during assembly of the split connecting rod into the engine. A low-cost, high-performance engine is thus provided. In addition, the use of a very tough material improves the engine tolerance.

A vehicle according to still another preferred embodiment of the present invention includes an engine that generates power, a drive wheel, and a transmission mechanism that transmits the power generated by the engine to the drive wheel, wherein the engine includes a cylinder, a piston arranged to move in a reciprocating manner in the cylinder, a piston pin provided on the piston, a crankshaft arranged to rotate, a crank pin provided in the crankshaft, and a split connecting rod that joins the piston pin and the crank pin, wherein the split connecting rod includes a rod body, a large end integrally provided at a first end of the rod body, and having a first opening into which the crank pin is inserted, and a small end integrally provided at a second end of the rod body, and having a second opening into which the piston pin is inserted, a fracture start groove located on each of opposing positions on an inner surface of the first opening such that one portion of a line extending along an axial direction of the first opening has a greater stress concentration factor than another portion of the line extending along the axial direction of the first opening, and the large end being separated by fracture separation along the fracture start groove.

In the vehicle, the power generated by the engine is transmitted to the drive wheel by the transmission mechanism. In the engine, the piston reciprocates in the cylinder. The piston pin is provided on the piston, the crank pin is provided in the rotatable crankshaft. The piston pin and the crank pin are joined by the split connecting rod. The crank pin is inserted into the first opening of the large end of the split connecting rod, and the piston pin is inserted into the second opening of the small end.

In the manufacture of the split connecting rod, the large end is separated by the fracture separation along single fracture planes, which prevents the formation of double cracks. This prevents the formation of a sizable projection on each of the fracture planes, and prevents falling of a broken piece therefrom. The assembly of the separated parts of the large end thus results in a high degree of roundness and cylindricality, while achieving a significant decrease in the percentage of defective products.

In addition, the large end of the split connecting rod can be separated by fracture separation using a simple jig without requiring the use of costly equipment. Therefore, the manufacturing cost of the split connecting rod is decreased. Furthermore, the use of a very tough material is possible and improves the tolerance of the split connecting rod.

Since the first opening of the split connecting rod has a high degree of roundness and cylindricality, friction losses in the engine are decreased, while the seizing up of the engine is prevented. Moreover, the damage to the engine parts due to a broken piece is prevented during assembly of the split connecting rod into the engine. A low-cost, high-performance engine is thus provided. In addition, the use of a very tough material improves the engine in tolerance. As a result, the performance and tolerance of the vehicle is greatly improved at reduced cost.

According to various preferred embodiments of the present invention, the large end is separated by the fracture separation along single fracture planes, which prevents the formation of double cracks. This prevents the formation of a sizable projection on each of the fracture planes, and prevents falling of a broken piece therefrom. The assembly of the separated portions of the large end thus results in a high degree of roundness and cylindricality, while achieving a significant decrease in the percentage of defective products.

In addition, the large end of the split connecting rod can be separated by fracture separation using a simple jig without requiring the use of costly equipment. Therefore, the manufacturing cost of the split connecting rod is significantly decreased. Furthermore, the use of a very tough material is possible and improves the tolerance of the split connecting rod.

The foregoing and other elements, features, steps, characteristics, aspects and advantages of the present invention will become more apparent from the following detailed description of preferred embodiments with reference to the accompanying drawings.

BRIEF DESCRIPTION OF THE DRAWINGS

FIG. 3a is a cross-section view of the split connecting rod of FIG. 2 along the line IV—IV, and FIG. 3b is a cross-section view of the split connecting rod of FIG. 2 along the line V—V;

FIGS. 17a–17d are cross-section views showing the steps of fracturing the large end to grinding the inner surface in the inventive example;

FIG. 20 is a schematic diagram showing fracture advance along a plane to be fractured for a split connecting rod according to a fourth preferred embodiment of the present invention;

DETAILED DESCRIPTION OF THE PREFERRED EMBODIMENTS

First Preferred Embodiment

Figure 1:
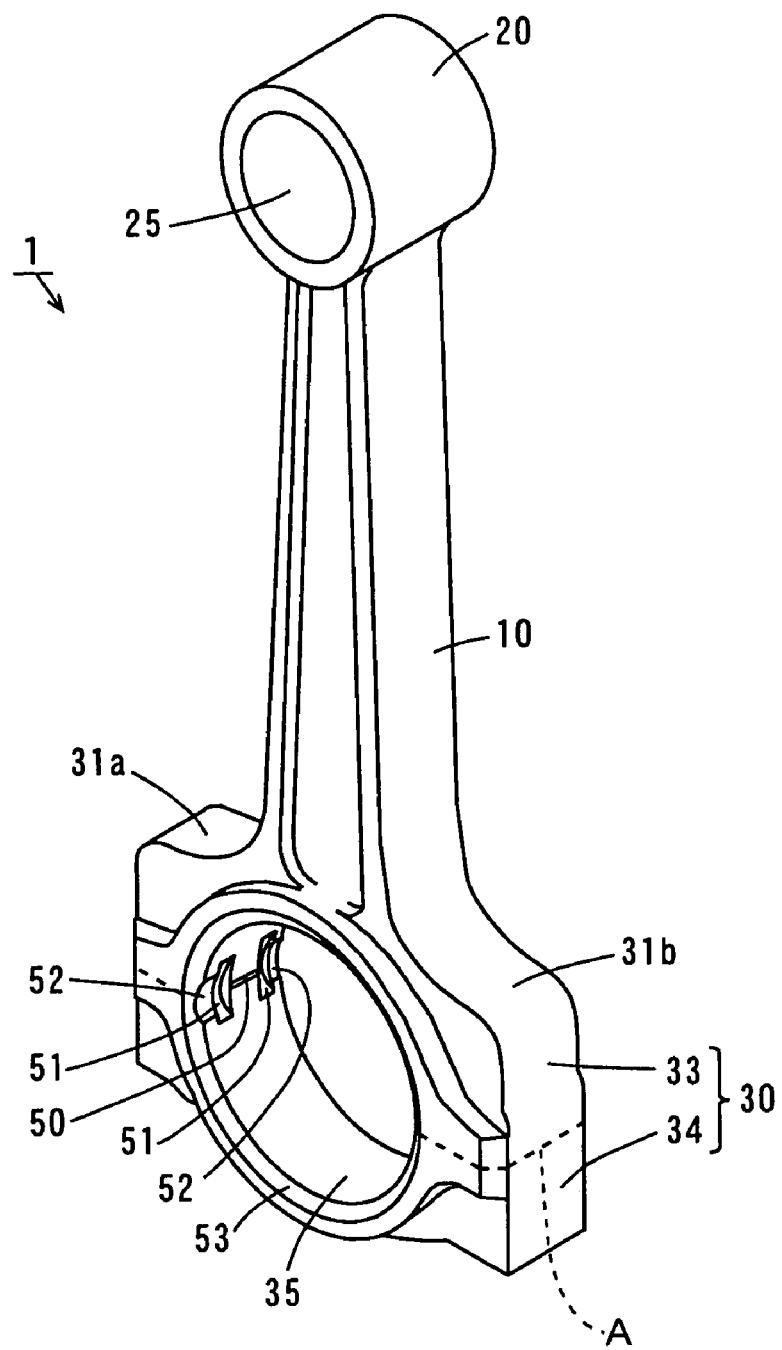
FIG. 1 is a perspective view of a split connecting rod before fracture separation according to a first preferred embodiment of the present invention.
Figure 2:
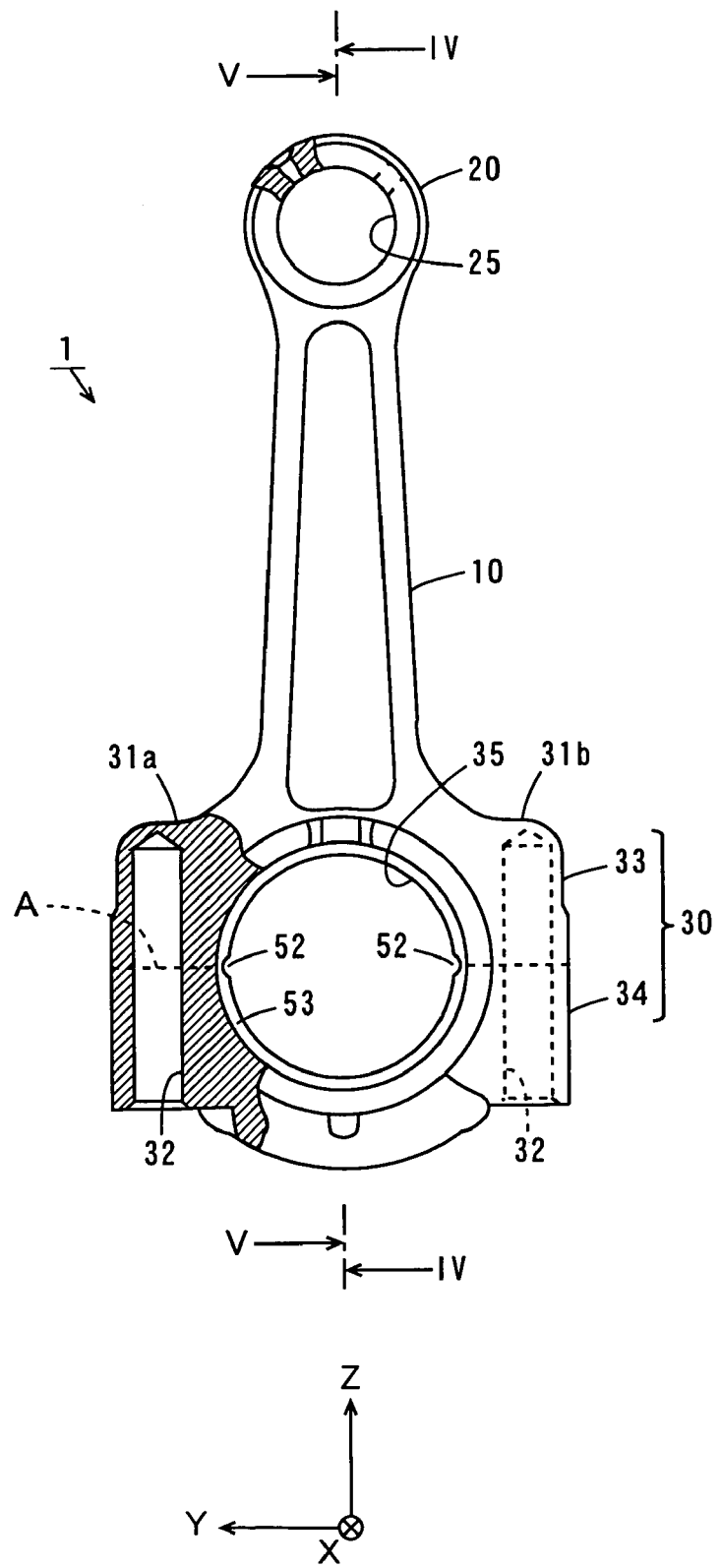
FIG. 2 is an elevation view of the split connecting rod of FIG. 1.
Figure 4:
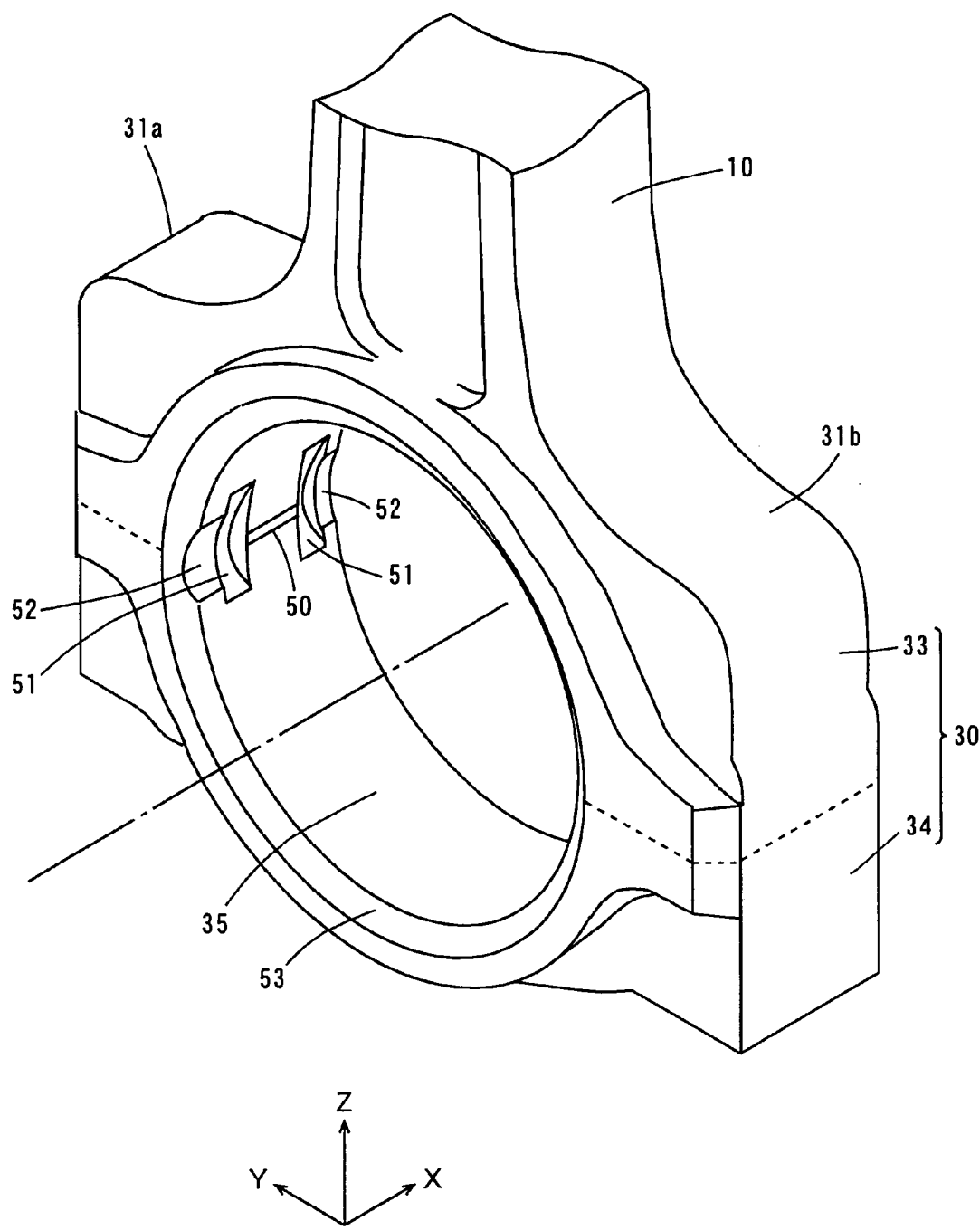
FIG. 4 is a perspective view of the partially enlarged split connecting rod of FIG. 1.

FIG. 1 is a perspective view of a split connecting rod before fracture separation according to a first preferred embodiment of the present invention. FIG. 2 is an elevation view of the split connecting rod of FIG. 1. FIG. 3a is a cross-section view of the split connecting rod of FIG. 2 along the line IV—IV, and FIG. 3b is a cross-section view of the split connecting rod of FIG. 2 along the line V—V. FIG. 4 is a perspective view of the partially enlarged split connecting rod of FIG. 1.

As shown in FIGS. 1, 2, 3(a) and 3(b), the split connecting rod 1 preferably includes a rod body 10, a small end 20, and a large end 30. The rod body 10 has the small end 20 integrally formed at its one end, and the large end 30 integrally formed at its other end, so as to form a single unitary member.

A substantially cylindrical piston pin opening 25 is formed in the small end 20. A substantially cylindrical crank pin opening 35 is formed in an approximately central portion of the large end 30. The large end 30 has shoulders 31a, 31b extending from the rod body 10 over the sides thereof. The shoulders 31a, 31b are provided with bolt holes 32 on both sides of the crank pin opening 35, respectively, extending from the lower surface of the large end 30 near the upper surface thereof.

The direction in which the rod body 10 extends will hereinafter be referred to as a longitudinal direction, the direction of the central axis of the crank pin opening 35 as shown by the dashed line in FIG. 4 will be simply referred to as an axial direction, and the direction that is perpendicular to the longitudinal and axial directions will be referred to as a width direction. In FIGS. 1 to 6 and FIGS. 11 to 20 described below, the longitudinal direction is represented by the arrow Z, the axial direction is represented by the arrow X, and the width direction is represented by the arrow Y.

The large end 30 before fracture separation includes a rod 33 and cap 34 already formed integrally therewith. As will be described later, the rod 33 and cap 34 of the large end 30 are fractured and separated along a plane A to be fractured in parallel with the axial direction X and width direction Y. The plane A to be fractured is arranged to pass the central axis of the crank pin opening 35. That is, the plane A to be fractured intersects with the inner surface of the crank pin opening 35.

Fracture start grooves 50 are formed to extend in the axial direction X at the centers of respective opposing positions on the inner surface of the crank pin opening 35. The fracture start grooves 50 are located at the centers of the lines where the inner surface of the crank pin opening 35 and the plane A to be fractured intersect with each other.

Bearing securing grooves 51 are preferably formed on either or both of the opposing positions on the inner surface of the crank pin opening 35 for securing a bearing metal that functions as a bearing. The bearing securing grooves 51 prevent revolution of the bearing metal.

In this preferred embodiment, the bearing securing grooves 51 are arranged to extend, respectively, across the fracture start groove 50 on the one side of the inner surface of the crank pin opening 35, as shown in FIG. 3a, with no bearing securing groove 51 formed on the other side, as shown in FIG. 3b.

Each of the bearing securing grooves 51 is preferably defined by a recess having a curved bottom surface and is arranged to extend in the circumferential direction of the crank pin opening 35. The bottom surface of each of the bearing securing grooves 51 preferably bends in the form of an arc along the cross section that is substantially perpendicular to the axial direction X.

In addition, notches 52 are provided, respectively, on both ends of each of the opposing positions on the inner surface of the crank pin opening 35 in the axial direction X. In the present preferred embodiment, as shown in FIG. 3a, the notches 52 are preferably formed, respectively, on the sides of the bearing securing grooves 51 on the one side of the inner surface of the crank pin opening 53, and as shown in FIG. 3b, the notches 52 are preferably formed, respectively, to extend across the fracture start groove 50 on the other side of the inner surface of the crank pin opening 35.

Each of the notches 52 having the curved bottom surface is arranged to extend in the circumferential direction of the crank pin opening 35. The bottom surface of each of the notches 52 preferably bends in the form of an arc along the cross section substantially perpendicular to the axial direction X.

In addition, chamfers 53 formed by chamfering the edges of the crank pin opening 35 are provided, respectively, and are arranged to extend in the circumferential direction of the crank pin opening 35.

Figure 5:
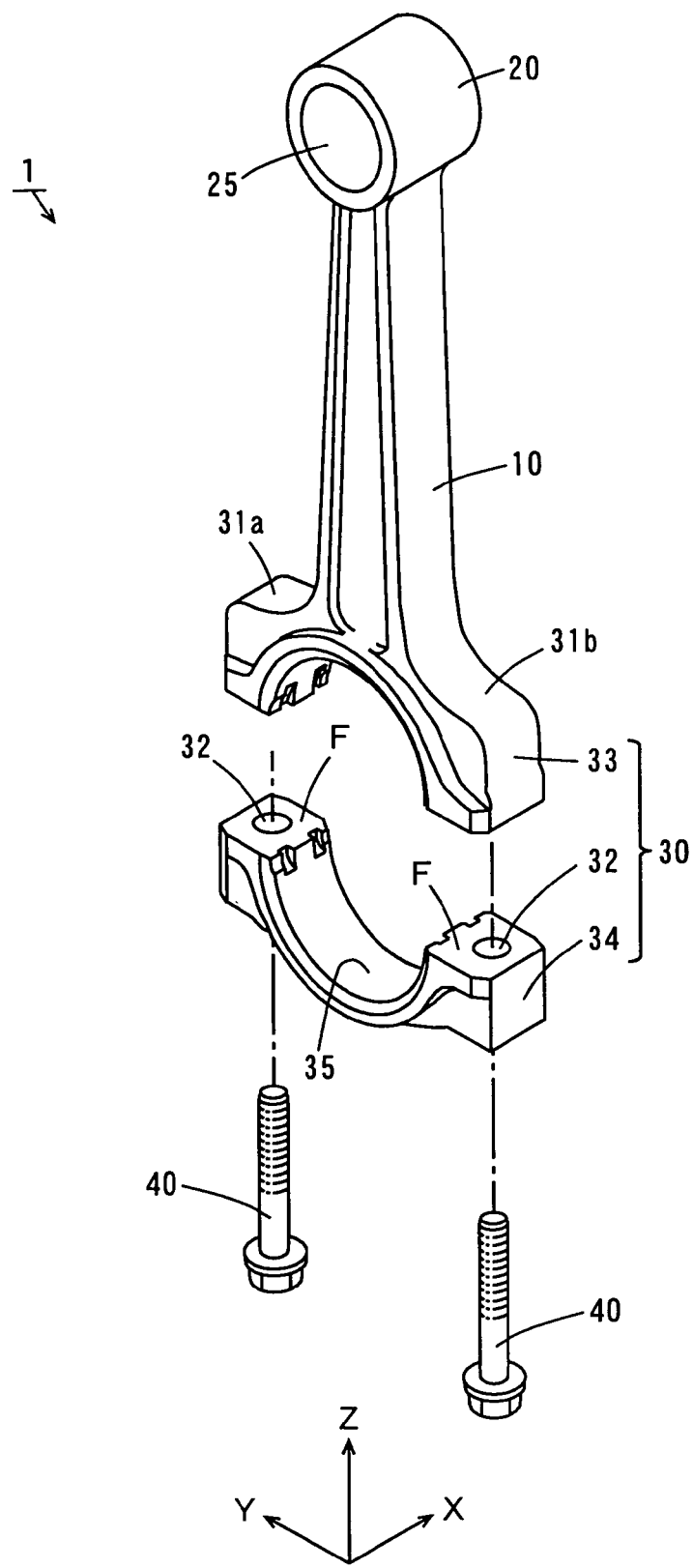
FIG. 5 is a perspective view of the assembly of the split connecting rod according to the first preferred embodiment of the present invention.
Figure 6:
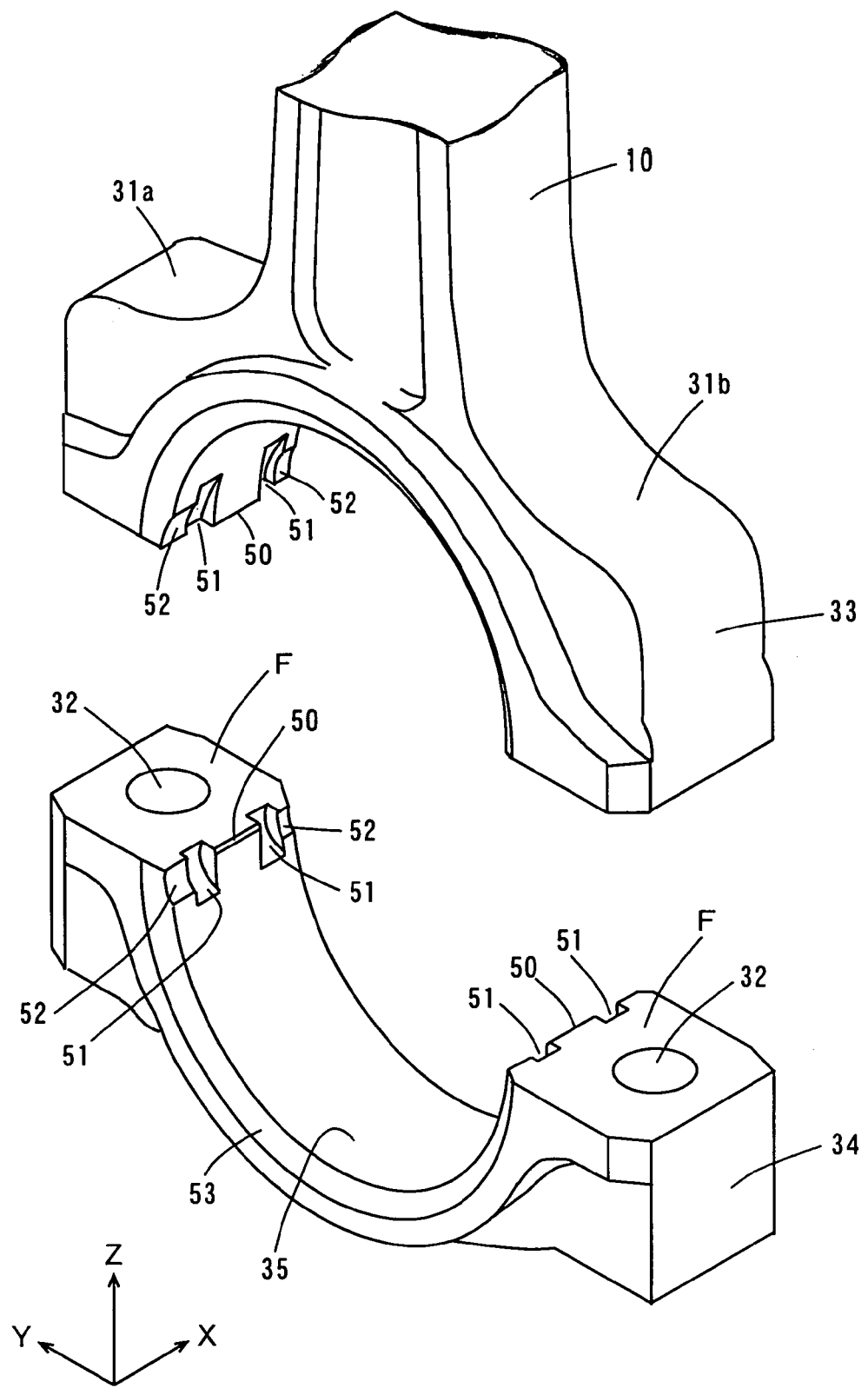
FIG. 6 is a perspective view of the partially enlarged split connecting rod of FIG. 5.

FIG. 5 is a perspective view of the assembly of the split connecting rod according to the first preferred embodiment of the present invention. FIG. 6 is a perspective view of the partially enlarged split connecting rod of FIG. 5.

The rod 33 and the cap 34 defining the large end 30 of the split connecting rod 1 are fractured and separated along the fracture start grooves 50. This results in the formation of fracture planes F on the rod 33 and the cap 34, respectively, as shown in FIGS. 5 and 6. The fracture planes F have fine irregularities.

The fracture planes F on the rod 33 and on the cap 34 are arranged to come into contact with each other. Bolts 40 are threaded into bolt holes 32 such that the rod 33 and cap 34 are joined to each other. Since the fracture planes F on the rod 33 and on the cap 34 have the fine irregularities that are complementary to each other, the rod 33 and the cap 34 can be accurately positioned relative to each other.

Figure 7:
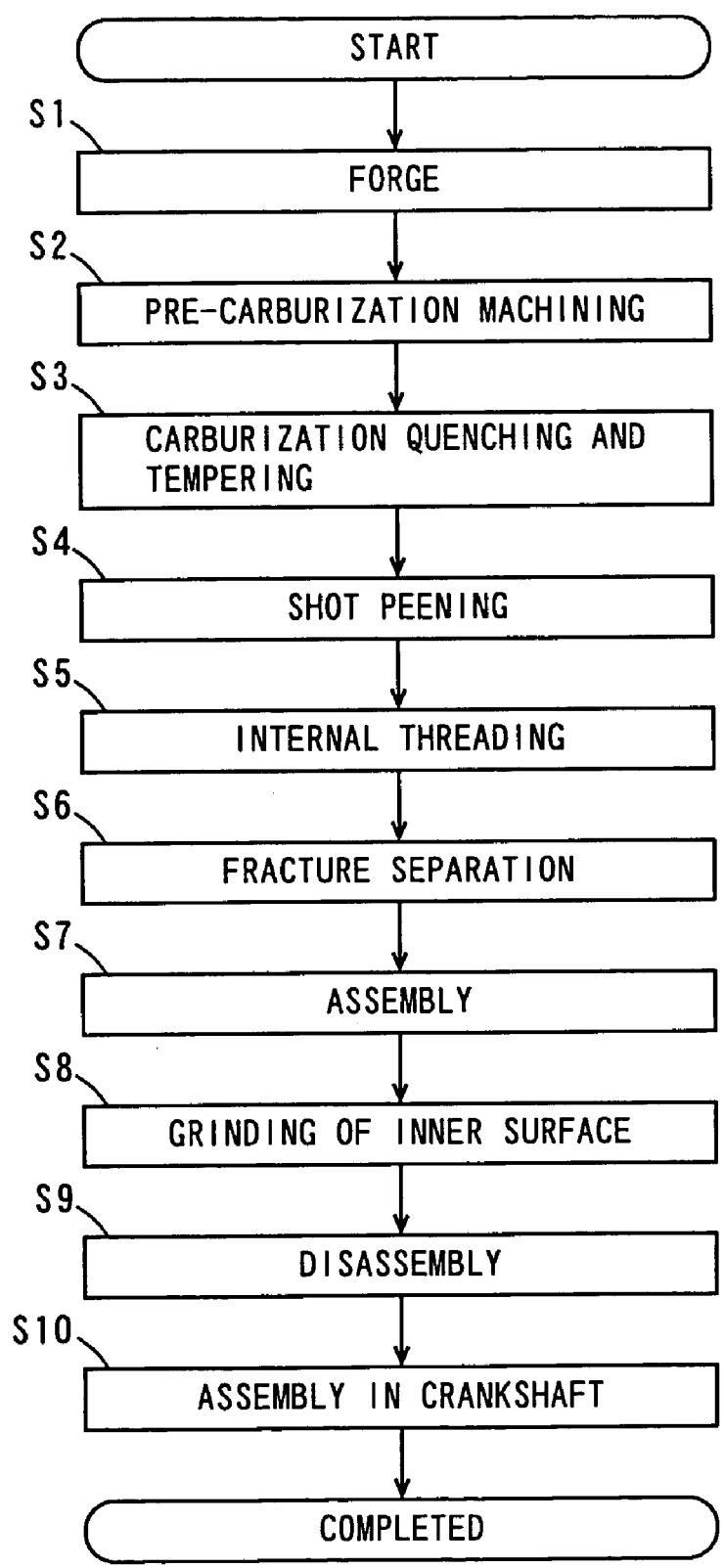
FIG. 7 is a flowchart showing a method of manufacturing the split connecting rod according to a preferred embodiment of the present invention.

A method of manufacturing the split connecting rod according to a preferred embodiment of the present invention will now be described. FIG. 7 is a flowchart showing the method of manufacturing the split connecting rod according to the present preferred embodiment.

Initially, a blank body of the connecting rod 1 including the rod body 10, the small end 20, and the large end 30 is formed preferably by forging (Step S1). In this case, the rod 33 and the cap 34 are formed integrally with the large end 30. Instead of forging, the connecting rod 1 may be formed by casting or sintering or other suitable process.

A steel containing carbon (C) is preferably used as a material of the connecting rod 1. It is preferable that the steel has a carbon content of about 0.05% to about 0.45% by weight, and more preferably about 0.10% to about 0.35% by weight, in a region where the carbon concentration is not increased due to carburization. This increases the toughness of the steel to improve the tolerance of the connecting rod 1.

In this preferred embodiment, SCM 420, which is a chromium molybdenum steel, is preferably used as an example of the material for the connecting rod 1. The SCM 420 includes about 0.18% to about 0.23% carbon (C) by weight, about 0.15% to about 0.35% silicon (Si) by weight, about 0.60% to about 0.85% manganese (Mn) by weight, about 0.030% or less phosphor (P) by weight, about 0.030% or less sulfur (S) by weight, about 0.90% to about 1.20% chromium (Cr) by weight, and about 0.15% to about 0.30% molybdenum (Mo) by weight, for example.

Alternatively, titanium (Ti) may be used as the material of the connecting rod 1. Still alternatively, a carbon steel with a large content of carbon (e.g., SAE 1070) may be used as the material of the connecting rod 1.

Figure 8:
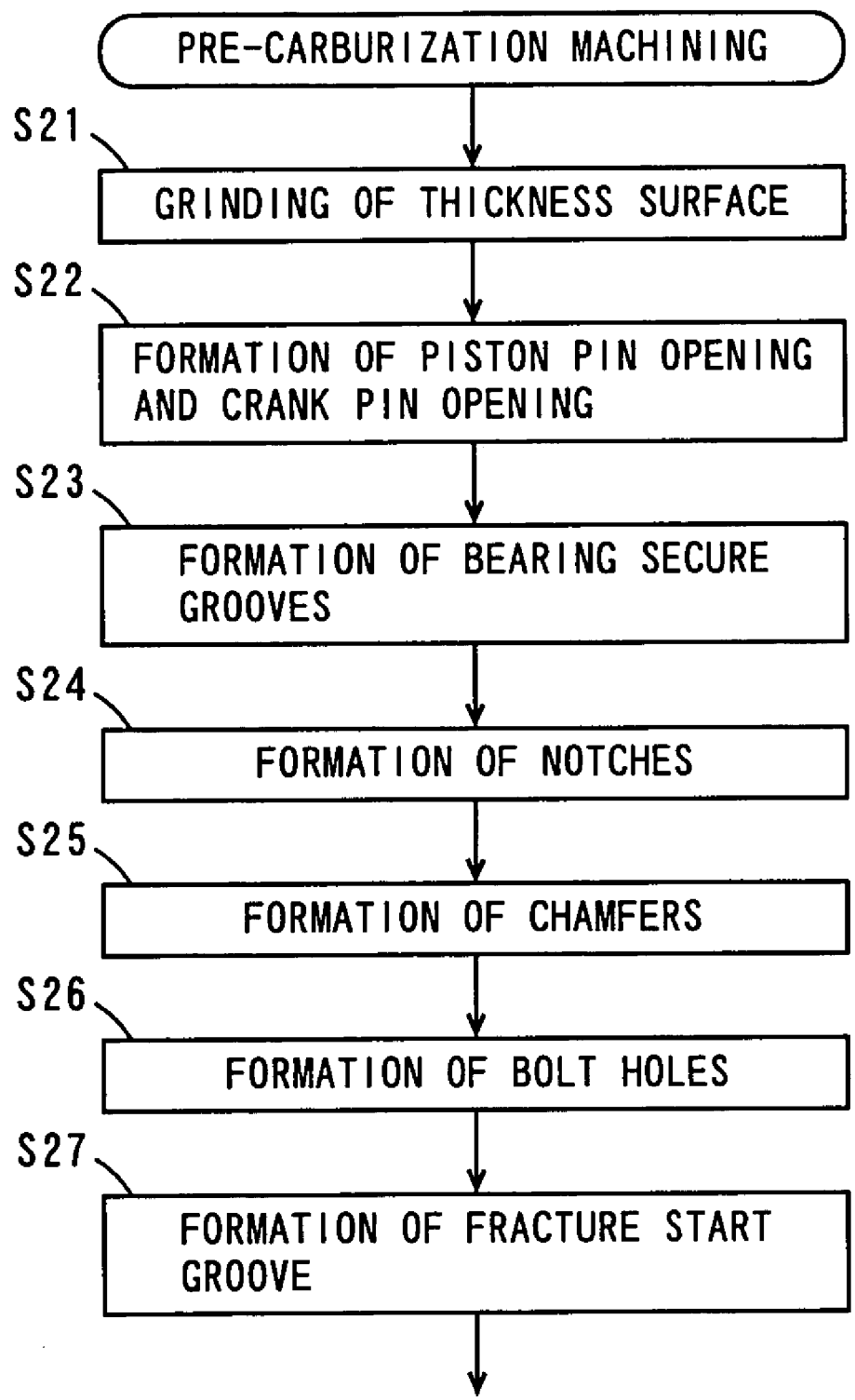
FIG. 8 is a flowchart showing pre-carburization machining in detail.

The connecting rod 1 is subsequently machined in preparation for carburization (Step S2). FIG. 8 is a flowchart showing pre-carburization machining in detail. The pre-carburization machining involves first grinding of a thickness surface of the connecting rod 1, i.e., the surface normal to the axial direction X, (Step S21), and the formation of the piston pin opening 25 and crank pin opening 35 in the small end 20 and the large end 30, respectively (Step S22).

Then, the bearing securing grooves 51 are formed on the inner surface of the crank pin opening 35 of the large end 30 (Step S23), followed by the formation of the notches 52 on both sides of the bearing securing grooves 51 (Step S24). The chamfers 53 are then formed at the edges of the crank pin opening 35 (Step S25), followed by the formation of the bolt holes 32 in the shoulders 31a, 31b of the connecting rod 1, respectively (Step S26).

The formation of the piston pin opening 25, crank pin opening 35, bearing securing grooves 51, notches 52, chamfers 53, and bolt holes 32 is preferably done by cutting.

After this, the fracture start grooves 50 are formed on the inner surface of the crank pin opening 35 (Step S27). In this preferred embodiment, the fracture start grooves 50 are preferably formed by a wire-cut EDM (Electrical Discharge Machining).

The wire-cut EDM involves the arrangement of an electrically conducting wire on the inner surface of the crank pin opening 35 along the axial direction X, and the application of a pulsed high voltage between the conducting wire and the inner surface of the crank pin opening 35. This causes a corona discharge between the conducting wire and the inner surface of the crank pin opening 35, thereby linearly cutting away the inner surface of the crank pin opening 35 except the bearing securing grooves 51, notches 52, and chamfers 53. As a result, the fracture start grooves 50 that linearly extend in the axial direction X are formed at the centers of the inner surface of the crank pin opening 35.

The wire-cut EDM allows for simultaneous formation of fracture start grooves 50 in a plurality of connecting rods 1. This results in improved productivity.

Note that the fracture start grooves 50 may be formed by other machining methods, such as laser machining or cutting or other suitable processes.

The grinding of the thickness surface of the connecting rod 1, formation of the piston pin opening 25 and crank pin opening 35, formation of the bearing securing grooves 51, formation of the notches 52, formation of the chamfers 53, formation of the bolt holes 32, and formation of the fracture start grooves 50 may be performed in any sequence other than that of FIG. 8.

As an example, the bearing securing grooves 51, notches 52, and chamfers 53 may be formed after the formation of the fracture start grooves 50.

Then, a surface hardening process, i.e., carburization, quenching, and tempering, is performed over the entire connecting rod 1 (Step S3 of FIG. 7). This results in the formation of a surface hardened layer extending over an entire surface of the connecting rod 1. The resultant depth of carburization is approximately 1.0 mm, for example.

Other surface hardening processes such as nitriding, spraying, vapor deposition, or high-frequency tempering may be adopted as an alternative.

After this, a shot peening process is applied to the connecting rod 1 (Step S4), and then the bolt holes 32 of the large end 30 are internally threaded (Step S5).

The large end 30 of the connecting rod 1 is then fractured and separated into the rod 33 and cap 34 (Step S6).

Figure 9:
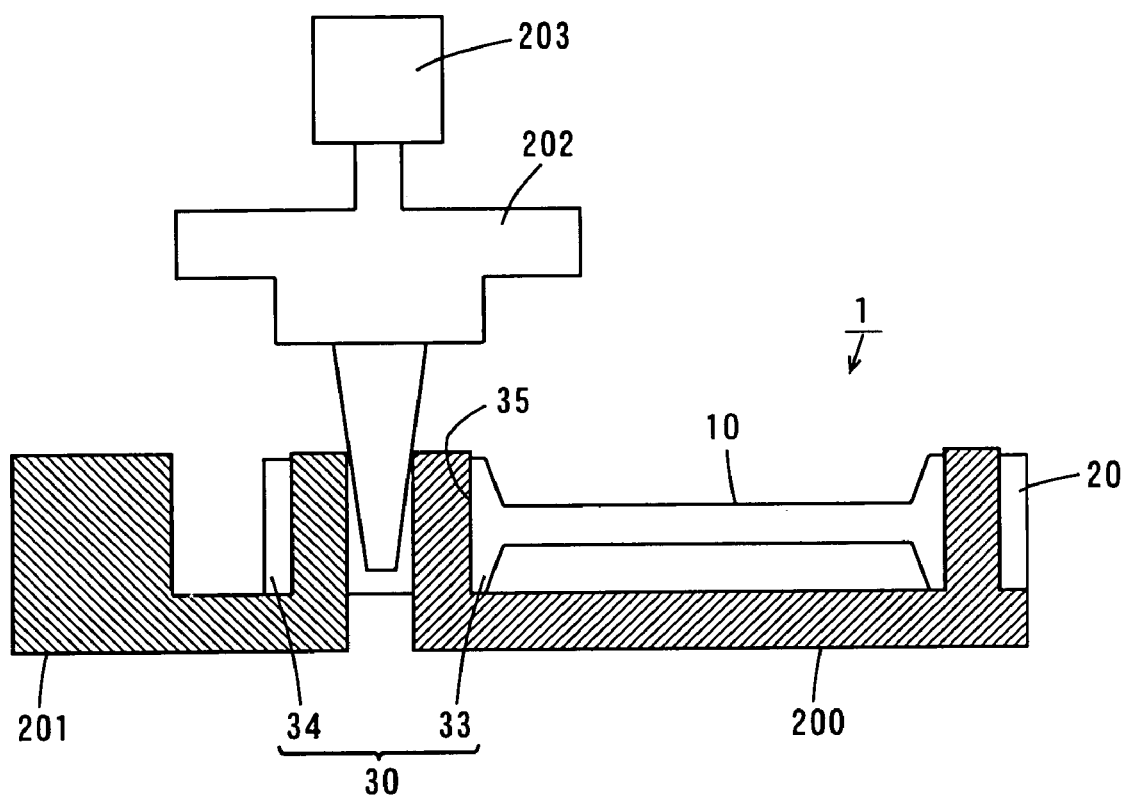
FIG. 9 is a schematic cross-section view illustrating a method of fracture separation.

FIG. 9 is a schematic cross-section view illustrating a method of fracture separation. The connecting rod 1 is preferably cooled with liquid nitrogen in advance. As shown in FIG. 9, projections of sliders 200, 201 that are horizontally movable relative to each other are inserted into the crank pin opening 35 of the large end 30 of the connecting rod 1, and a wedge 202 is hammered into the gap between the projections of the sliders 200, 201 with a weight 203. This causes the large end 30 of the connecting rod 1 to be fractured and separated into the rod 33 and the cap 34 along the fracture start grooves 50.

Following this, the bolts 40 are screwed into the bolt holes 32, with the fracture planes F on the rod 33 and the cap 34 being positioned to contact with each other as described above, so that the rod 33 and the cap 34 are assembled (Step S7 of FIG. 7).

Then, the inner surfaces of the piston pin opening 25 of the small end 20 and the crank pin opening 35 of the large end 30 of the assembled connecting rod 1 are grinded (Step S8). Thus, the nutless type split connecting rod 1 is manufactured.

The rod 33 and the cap 34 are subsequently disassembled by removing the bolts 40 from the large end 30 of the assembled connecting rod 1 (Step S9). Lastly, the disassembled rod 33 and cap 34 are assembled into the crank pin of the crankshaft (Step S10).

Now, the shapes of the fracture start grooves 50, notches 52, and bearing securing grooves 51, and the stress concentration factors thereof will be described.

Figure 10A:
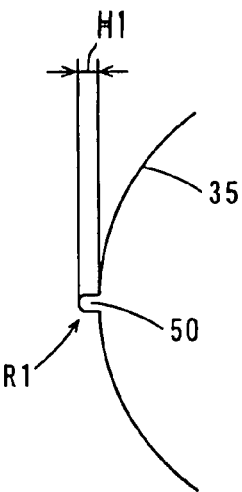
FIG. 10a is a cross-section view showing the shape of a fracture start groove.
Figure 10B:
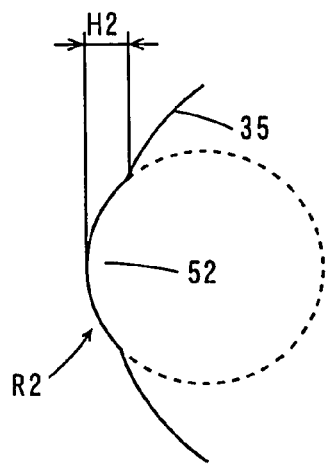
FIG. 10b is a cross-section view showing the shape of a notch.

FIG. 10a is a cross-section view showing the shape of the fracture start groove 50; FIG. 10b is a cross-section view showing the shape of the notch 52; and FIG. 10c is a cross-section view showing the shape of the bearing securing groove 51.

As shown in FIG. 10a, the fracture start groove 50 preferably includes opposing surfaces arranged substantially in parallel with each other and a semicircular bottom surface. The depth H1 of the fracture start groove 50 is, for example, about 0.5 mm, and the radius of the curvature R1 of the bottom surface is, for example, about 0.1 mm.

As shown in FIG. 10b, the notch 52 preferably includes an arc-shaped bottom surface. The depth H2 of the notch 52 is, for example, about 0.5 mm, and the radius of the curvature R2 of the bottom surface is, for example, about 6.5 mm.

Figure 10C:
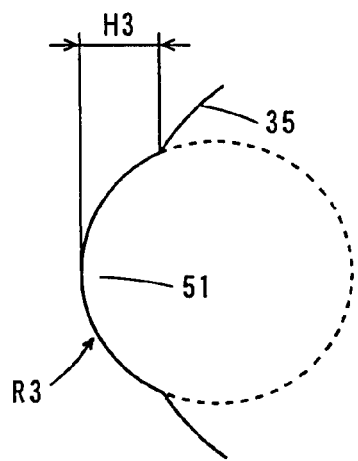
FIG. 10c is a cross-section view showing the shape of a bearing securing groove.

As shown in FIG. 10c, the bearing securing groove 51 preferably includes an arc-shaped bottom surface. The depth H3 of the bearing securing groove 51 is, for example, about 1.6 mm, and the radius of the curvature R3 of the bottom surface is, for example, about 6.5 mm.

The depth H2 of the notch 52 and the depth H3 of the bearing securing groove 51 are preferably equal to or greater than the depth H1 of the fracture start groove 50. In this preferred embodiment, the depth H2 of the notch 52 is preferably almost equal to the depth H1 of the fracture start groove 50, the depth H3 of the bearing securing groove 51 being greater than the depth H1 of the fracture start groove 50. The radius of the curvature R2 of the bottom surface of the notch 52 is greater than the radius of the curvature R1 of the bottom surface of the fracture start groove 50, the radius of the curvature R3 of the bottom surface of the bearing securing groove 51 being greater than the radius of the curvature R1 of the fracture start groove 50.

In general, the stress concentration factor α can be determined by the following equation:

$$\alpha = 1 + 2\sqrt{(H/R)} \quad (1)$$

where H represents the depth of the notch, and R represents the radius of the curvature thereof.

With the depth H1 of the fracture start groove 50 of about 0.5 mm, and the radius of the curvature R1 of about 0.1, the stress concentration factor α is about 5.5 according to the above equation (1).

With the depth H2 of the notch 52 of about 0.5 mm, and the radius of the curvature R2 of about 6.5 mm, the stress concentration factor α is about 1.6 according to the above equation (1). With the depth H3 of the bearing securing groove 51 of about 1.6 mm, and the radius of the curvature R3 of about 6.5 mm, the stress concentration factor α is about 2.0 according to the above equation (1).

Thus, the stress concentration factor of the fracture start groove 50 is greater than those of the notch 52 and bearing securing groove 51.

This results in the concentration of stress at the fracture start groove 50 on the inner surface of the crank pin opening 35, thereby alleviating and minimizing stress concentration at the notch 52 and bearing securing groove 51. This results in the concentration of stress at the center of the inner surface of the crank pin opening 35.

In the following inventive example and comparative example, the action of the fracture start grooves 50 and notches 52 during the fracture separation of the large end 30 was verified. In the inventive example, a large end provided with the notches 52 was separated by fracture separation, whereas in the comparative example, a large end without the notches 52 was separated by fracture separation. The large end in the inventive example is the same as the large end 30 of FIGS. 1 to 4.

SCM 420, which is a chromium molybdenum steel, was used as the material of the connecting rod 1. A surface hardened layer of the SCM 420 after carburization, quenching, and tempering, has a carbon content of about 0.7% to about 0.8% by weight and a Charpy impact value of about 7 J/cm² to about 12 J/cm². The inside of the SCM 420 after carburization, quenching, and tempering has a carbon content of about 0.18% to about 0.23% by weight, and a Charpy impact value of about 60 J/cm² to about 70 J/cm². This improves the toughness of the inside of the connecting rod 1.

Note that SAE 1070 (equivalent of the JIS S70C) used as the material for the conventional split connecting rod has a carbon content of 0.65% to 0.75% by weight, and a Charpy impact value of 20 J/cm² to 26 J/cm².

Figure 14A:
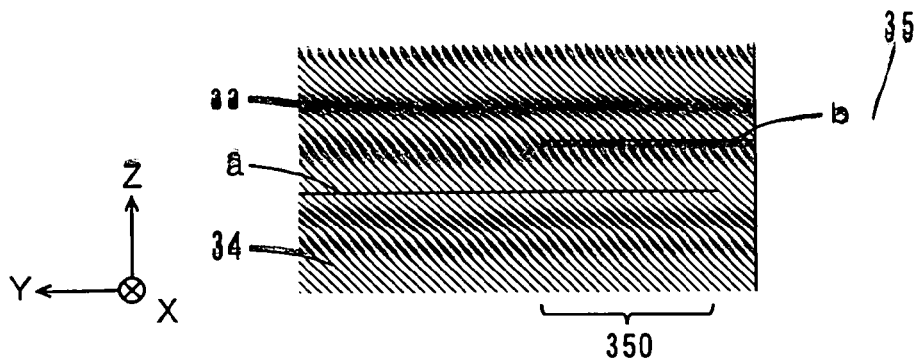
FIGS. 14a–14d are cross-section views showing the steps of fracturing the large end to grinding the inner surface in the comparative example.
Figure 14B:
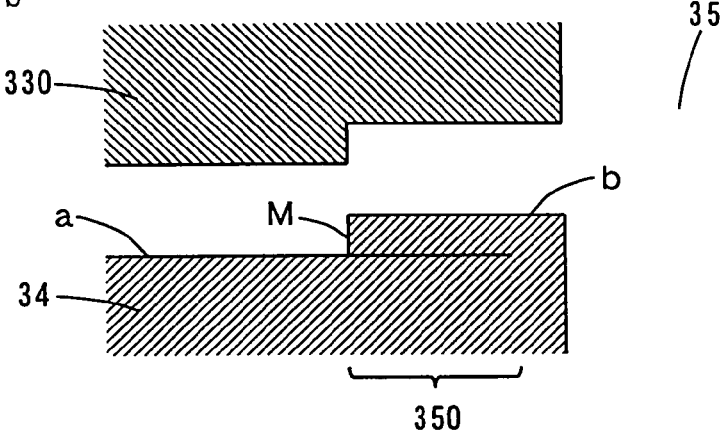
Figure 14C:
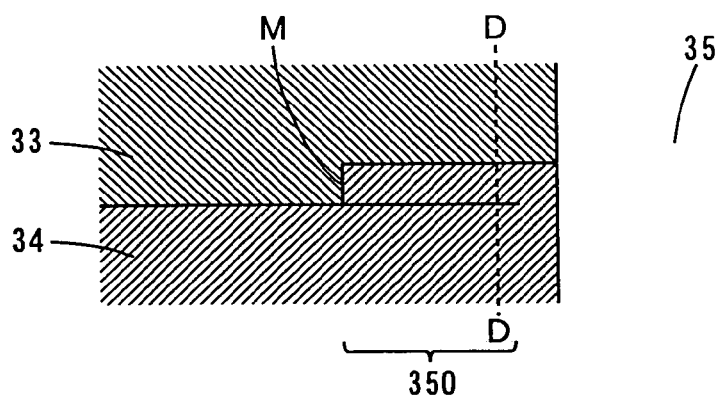
Figure 14D:
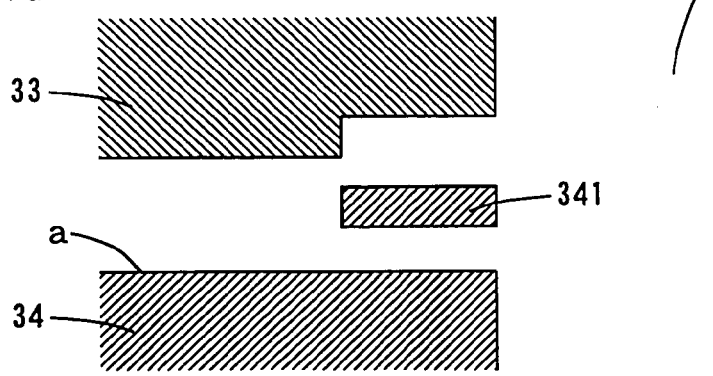
Figure 15:
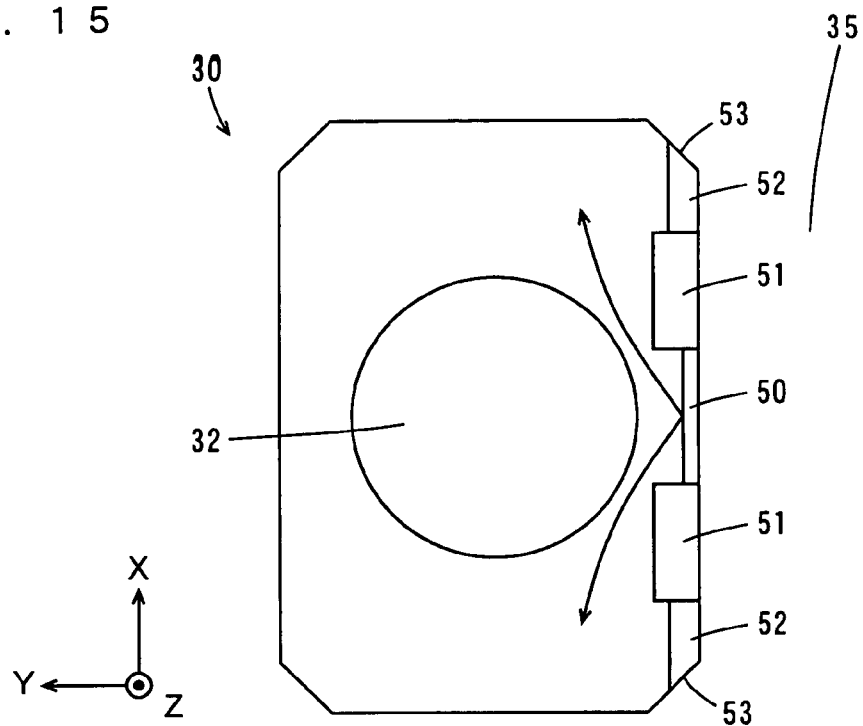
FIG. 15 is a diagram illustrating fracture advance along a plane to be fractured for the large end in an inventive example.
Figure 16:
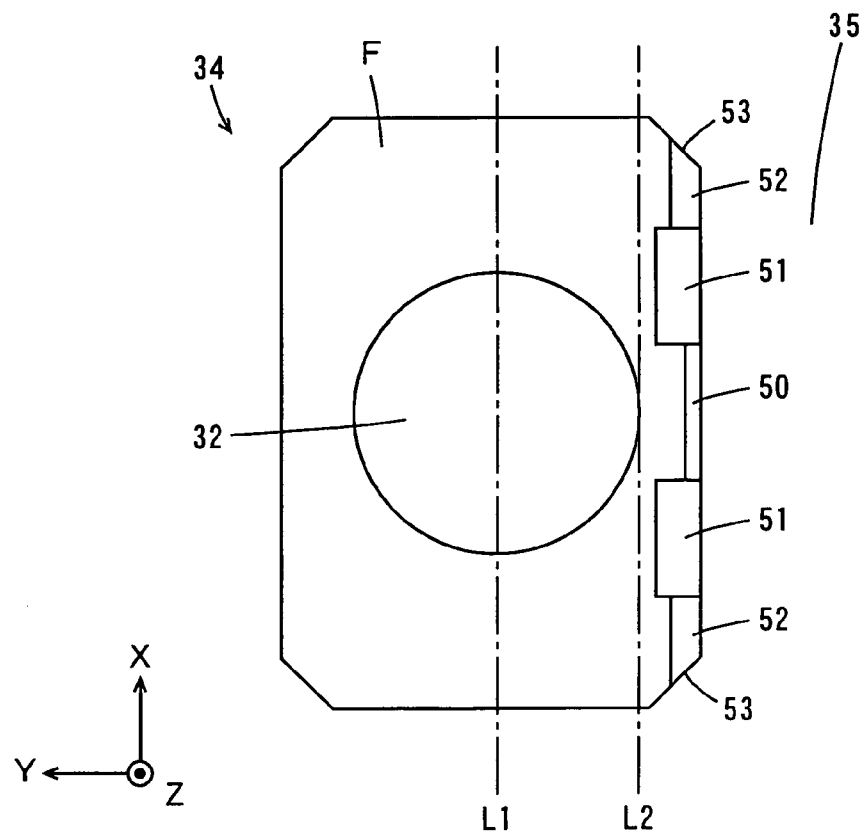
FIG. 16 is a diagram showing the condition of the fracture plane for the large end in the inventive example.

With reference to FIGS. 11 to 14, description is first made of fracture advance on the large end without notches in the comparative example, and then with reference to FIGS. 15 to 17, description is made of fracture advance on the large end with notches in the inventive example.

Figure 11:
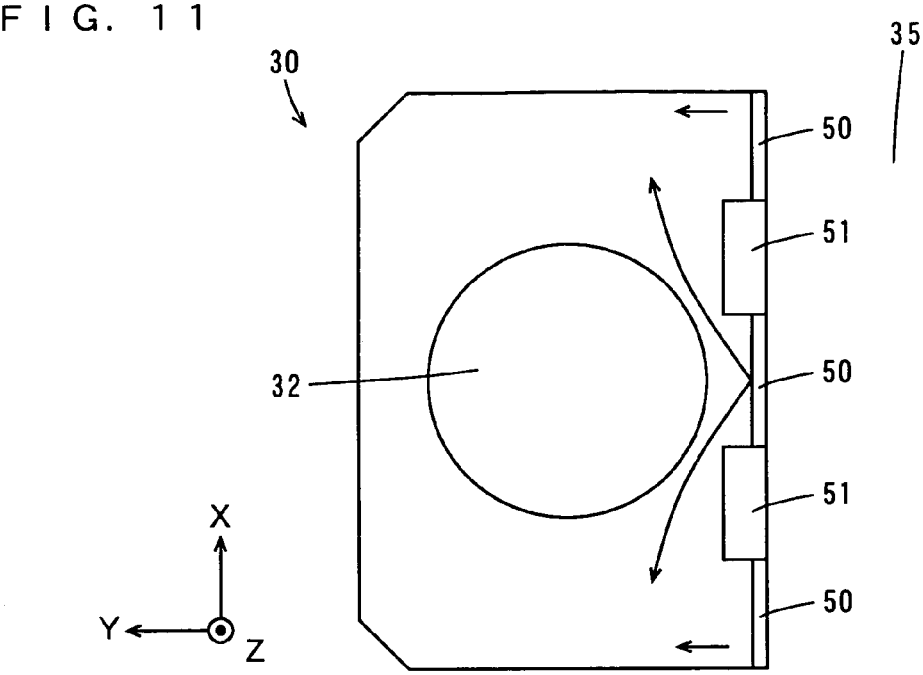
FIG. 11 is a diagram illustrating fracture advance along a plane to be fractured for the large end in a comparative example.
Figure 12:
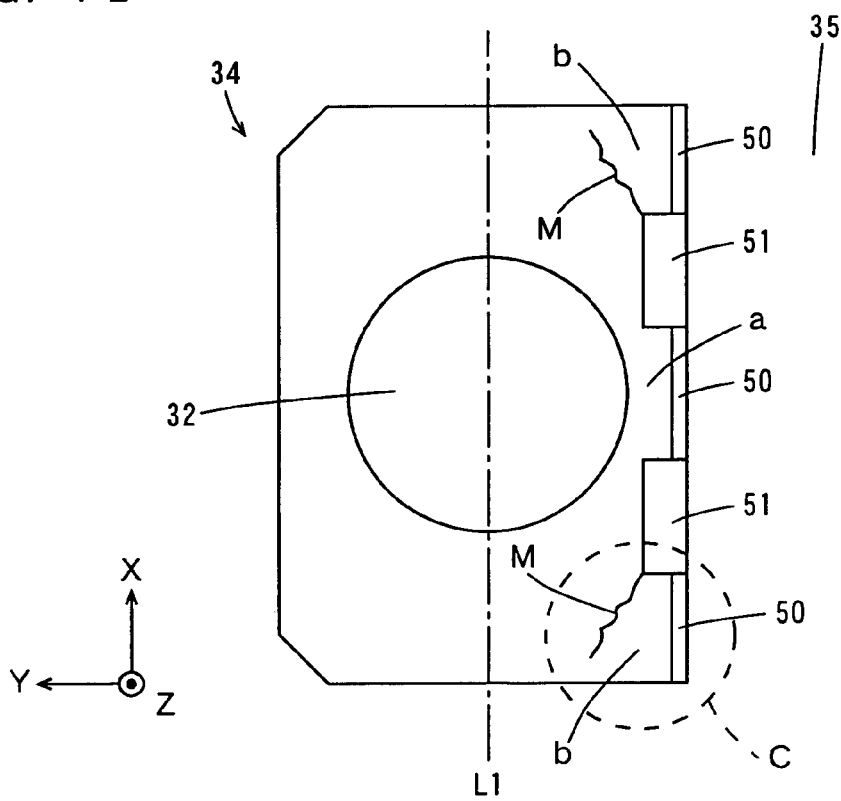
FIG. 12 is a diagram showing the condition of the fracture plane for the large end in the comparative example.
Figure 13:
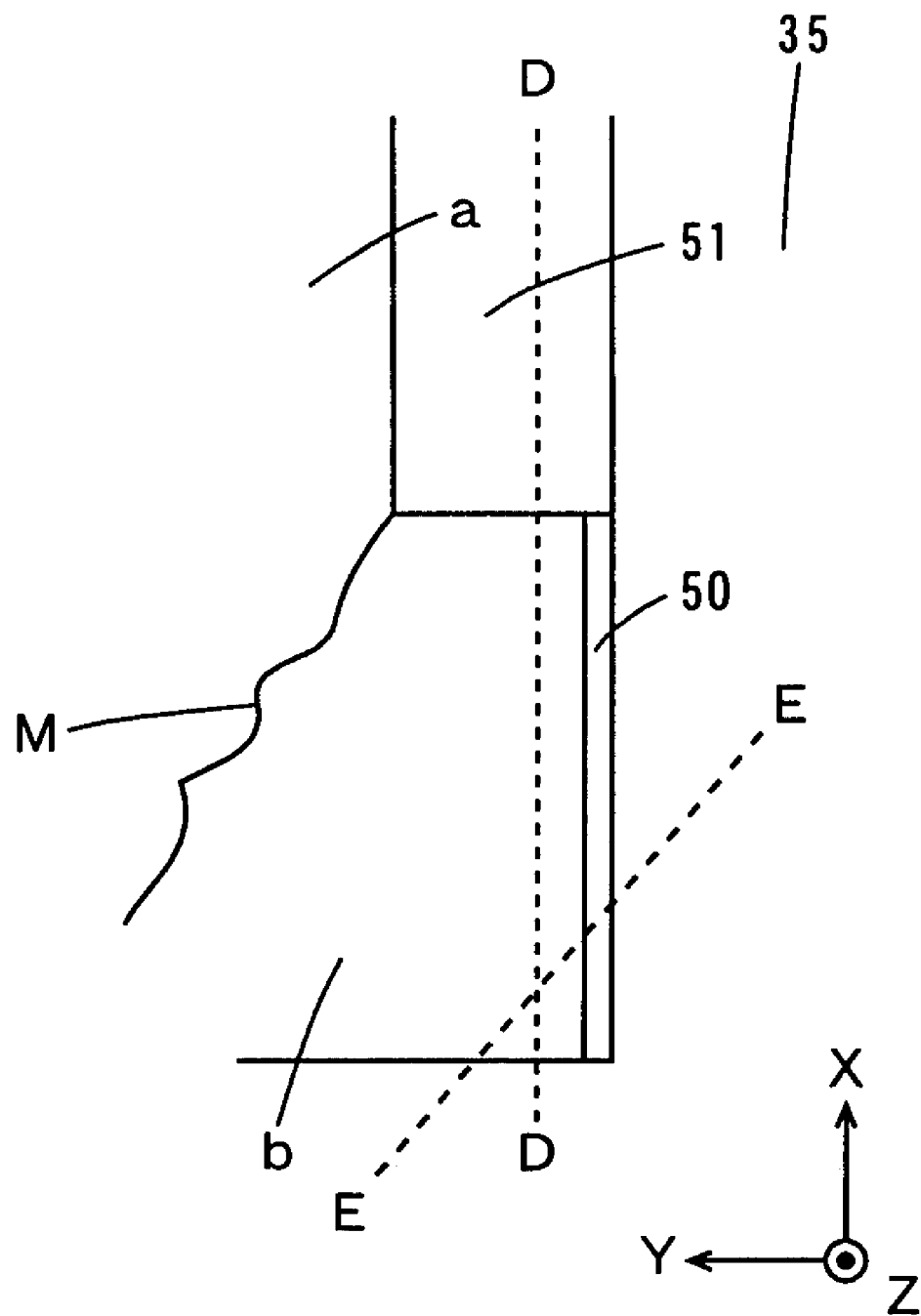
FIG. 13 is an enlarged view of the area C of FIG. 12.

FIG. 11 is a diagram illustrating the fracture advance along a plane to be fractured for the large end in the comparative example; FIG. 12 is a diagram showing the condition of the fracture plane for the large end in the comparative example; FIG. 13 is an enlarged view of the area C of FIG. 12; and FIGS. 14a–14d are cross-section views showing the steps of fracturing the large end to grinding the inner surface in the comparative example.

In the comparative example of FIG. 11, a pair of bearing securing grooves 51 are provided on the inner surface of the crank pin opening 35 of the large end 30, where fracture start grooves 50 are formed between and both ends of the pair of bearing securing grooves 51, respectively.

Stress in general tends to concentrate at thinner portions and end portions. With the bolt hole 32 provided in the center of the large end 30, the center of the inner surface of the crank pin opening 35 corresponds to the thinner portion. Thus, stresses are concentrated at the center and both ends of the inner surface of the crank pin opening 35.

Accordingly, with the comparative example of FIG. 11, the fracture starts from the three points of the fracture start grooves 50 at the center and both ends of the inner surface of the crank pin opening 35. As a result, the fracture advances from the three points, i.e., the center and both ends of the inner surface of the crank pin opening 35, as shown by the arrows of FIG. 11.

In this case, as shown in FIGS. 12 and 13, when the fracture plane a formed by the fracture from the center of the inner surface of the crank pin opening 35 and the fracture planes b formed by the fractures from the both ends develop at a different level, a region 350 as shown in FIG. 14a is formed where the fracture plane a and the fracture plane b overlap each other by a certain distance, resulting in the formation of double cracks.

Note that the inner surface of the crank pin opening 35 is grinded to the line D—D in a subsequent step, as shown in FIG. 13. The conventional manufacturing method for the split connecting rod further involves the chamfering of an edge of the crank pin opening 35 to the line E—E, in a subsequent step after the fracture separation.

Next, as shown in FIG. 14b, separation of the rod 33 and the cap 34 causes a difference in level at a junction M of the fracture plane a and fracture plane b. As shown in FIG. 12, the junction M is closer to the crank pin opening 35 relative to the center line L1 of the large end 30 in the width direction Y.

Then, as shown in FIG. 14c, after the assembly of the rod 33 and the cap 34, the inner surface of the crank pin opening 35 is grinded to the line D—D. Upon disassembly of the rod 33 and the cap 34, a broken piece 341 falls off the region 350, as shown in FIG. 14d, where the fracture plane a and the fracture plane b overlap.

FIG. 15 is a diagram illustrating fracture advance along a plane to be fractured for the large end in the inventive example; FIG. 16 is a diagram showing the condition of the fracture plane for the large end in the inventive example; and FIGS. 17a–17d are cross-section views showing the steps of fracturing the large end to grinding the inner surface in the inventive example.

In the inventive example of FIG. 15, the inner surface of the crank pin opening 35 of the large end 30 is sectioned by a pair of bearing securing grooves 51 into three parts including the approximate center, the two ends and the edges of the crank pin opening. A fracture start groove 50 is formed at the approximate center, notches 52 are formed on both ends, and chamfers 53 are formed at the edges of the crank pin opening 35.

Since the stress concentration factor of the notches 52 is smaller than that of the fracture start groove 50, stress concentration is alleviated on both ends of the crank pin opening 35. In addition, the formation of the chamfers 53 at the edges of the crank pin opening 35 alleviates and minimizes stress concentration at the edges of the crank pin opening 35. This results in the concentration of stress at the approximate center of the inner surface of the crank pin opening 35.

Thus, in the example of FIG. 15, the fracture starts from the single point at the approximate center of the inner surface of the crank pin opening 35. As a result, the fracture advances from the single point at the approximate center of the inner surface of the crank pin opening 35, as shown by the arrows of FIG. 15.

In this case, as shown in FIG. 16, a fracture plane F is formed by the fracture from the approximate center of the inner surface of the crank pin opening 35. As shown in FIG. 17a, the rod 33 and the cap 34 are fractured and separated along the single fracture plane F, which prevents the formation of double cracks.

Accordingly, as shown in FIG. 17b, upon separation of the rod 33 and the cap 34, there is no difference in level on the fracture plane F.

Then, as shown in FIG. 17c, after the assembly of the rod 33 and the cap 34, the inner surface of the crank pin opening 35 is grinded to the line D—D. As shown in FIG. 17d, no broken piece falls off upon disassembly of the rod 33 and the cap 34.

Thus, in the present preferred embodiment, there is no region where a plurality of fracture planes overlap between the center line L1 of the large end 30 and the inner surface of the crank pin opening 35 in the width direction Y, as shown in FIG. 16. The elimination of such a region at least between the line L2 tangent to the bolt hole 32 in parallel with the axial direction X and the inner surface of the crank pin opening 35 prevents a broken piece from falling off during the grinding of the inner surface of the crank pin opening 35.

In the split connecting rod 1 according to the present preferred embodiment, even with the use of a very tough material, the fracture starts from the single point on the inner surface of the crank pin opening 35 upon fracture separation of the large end 30, so that the fracture advances from the single point at the approximate center of the inner surface of the crank pin opening 35. This causes the large end 30 to be fractured and separated into the rod 33 and the cap 34 along the single fracture plane F, thereby preventing the formation of double cracks. This prevents the formation of a sizable projection on the fracture plane F and the falling of a broken piece from the fracture plane F. The assembly of the rod 33 and the cap 34 of the large end thus results in a high degree of roundness and cylindricality while achieving a significant a decrease in the percentage of defective products.

In addition, the fracture separation of the large end 30 of the split connecting rod 1 can be performed using the simple jig shown in FIG. 9 without requiring costly equipment. Therefore, the manufacturing cost of the split connecting rod 1 is reduced. Moreover, the use of a very tough material improves the tolerance of the split connecting rod 1.

In the present preferred embodiment, the crank pin opening 35 preferably corresponds to an opening of a large end or a first opening, and the piston pin opening 25 corresponds to a second opening.

Second Preferred Embodiment

Figure 18:
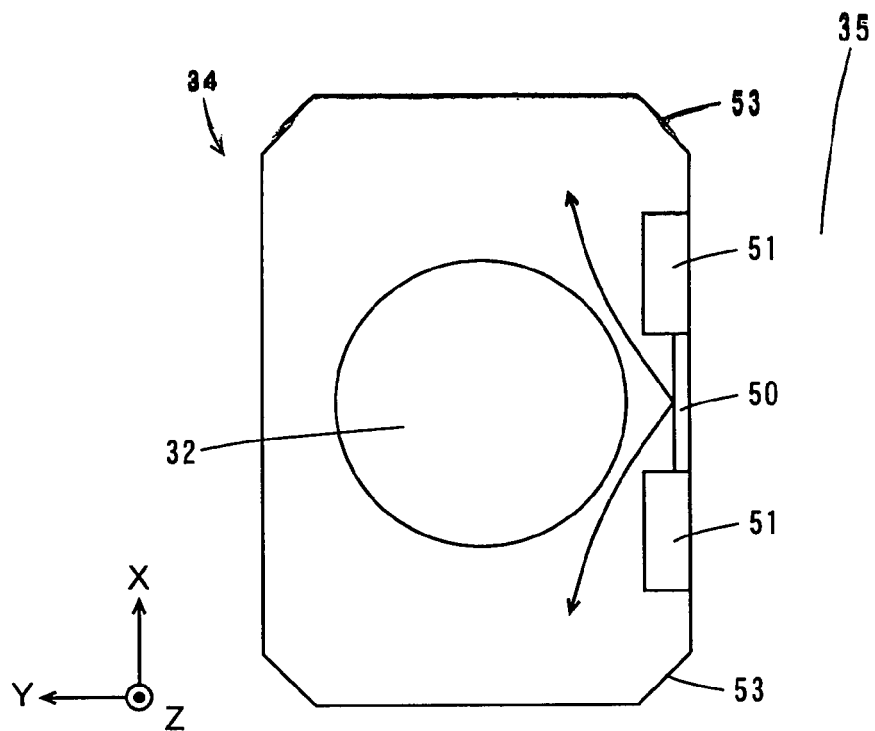
FIG. 18 is a schematic diagram showing fracture advance along a plane to be fractured for a split connecting rod according to a second preferred embodiment of the present invention.

FIG. 18 is a schematic diagram showing fracture advance along a plane to be fractured for a split connecting rod according to a second preferred embodiment of the present invention.

In the second preferred embodiment, the inner surface of the crank pin opening 35 of the large end 30 is sectioned by a pair of bearing securing grooves 51 into three parts: a fracture start groove 50 is formed on the approximate center, chamfers 53 are formed at the edges of the crank pin opening 35, with both sides of the bearing securing grooves 51 remaining flat without the formation of any fracture start grooves 50 and notches 52. The fracture start groove 50 is preferably formed by laser machining, cutting or other suitable processes.

The stress concentration factor of the flat surface is smaller than that of the fracture start groove 50, so that the stress concentration on both ends of the inner surface of the crank pin opening 35 is alleviated and minimized. In addition, the formation of the chamfers 53 at the edges of the crank pin opening 35 alleviates and minimizes stress concentration at the edges of the crank pin opening 35. This results in the concentration of stress at the approximate center of the inner surface of the crank pin opening 35.

Thus, the fracture starts from the single point at the approximate center of the inner surface of the crank pin opening 35. As a result, the fracture advances from the single point at the approximate center of the inner surface of the crank pin opening 35, as shown by the arrows of FIG. 18.

In this case, a fracture plane is formed by the fracture from the approximate center of the inner surface of the crank pin opening 35. This causes the large end 30 to be fractured and separated into the rod 33 and the cap 34 along the single fracture plane, thereby preventing the formation of double cracks.

Third Preferred Embodiment

Figure 19:
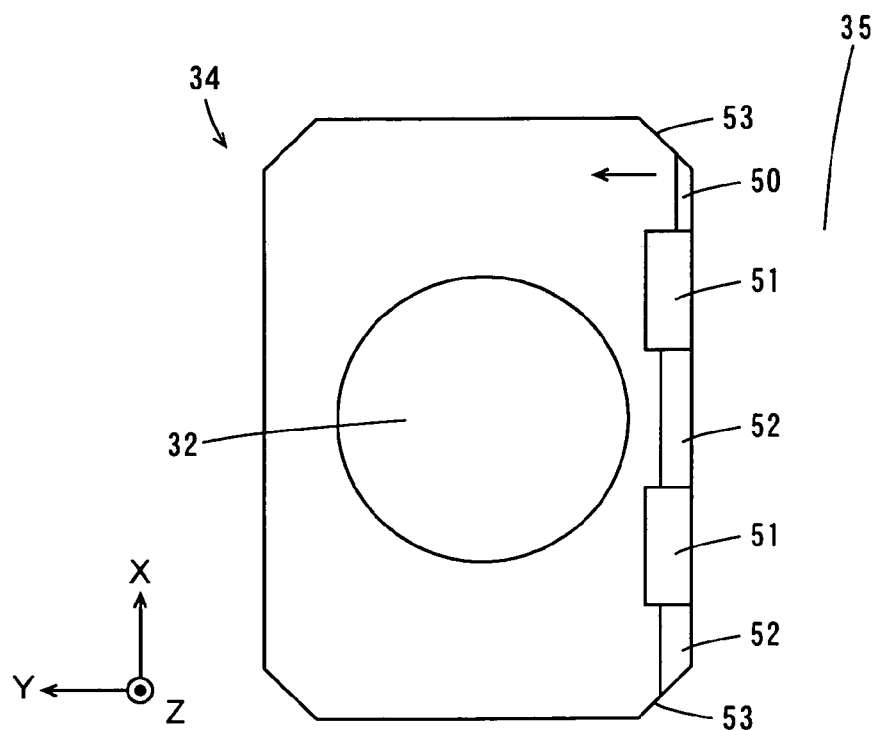
FIG. 19 is a schematic diagram showing fracture advance along a plane to be fractured for a split connecting rod according to a third preferred embodiment of the present invention.

FIG. 19 is a schematic diagram showing fracture advance along a plane to be fractured for a split connecting rod according to a third preferred embodiment of the present invention.

In the third preferred embodiment, the inner surface of the crank pin opening 35 of the large end 30 is sectioned by a pair of bearing securing grooves 51 into three parts: a fracture start groove 50 is formed on one end, notches 52 are formed on the approximate center and the other end, and chamfers 53 are formed at the edges of the crank pin opening 35. The fracture start groove 50 is formed by laser machining, cutting, or other suitable processes.

In this case, stress concentration is alleviated and minimized at the other end and the approximate center of the inner surface of the crank pin opening 35. In addition, the formation of the chamfers 53 at the edges of the crank pin opening 35 alleviates and minimizes stress concentration at the edges of the crank pin opening 35. This results in the concentration of stress at the one end of the inner surface of the crank pin opening 35.

Thus, the fracture starts from the single point at the one end of the inner surface of the crank pin opening 35. As a result, the fracture advances from the single point at the one end of the inner surface of the crank pin opening 35, as shown by the arrow of FIG. 19.

In this case, a fracture plane is formed by the fracture from the one end of the inner surface of the crank pin opening 35. This causes the large end 30 to be fractured and separated into the rod 33 and the cap 34 along the single fracture plane, thereby preventing the formation of double cracks.

Fourth Preferred Embodiment

FIG. 20 is a schematic diagram showing fracture advance along a plane to be fractured for a split connecting rod according to a fourth preferred embodiment of the present invention.

In the fourth preferred embodiment, the inner surface of the crank pin opening 35 of the large end 30 is sectioned by a pair of bearing securing grooves 51 into three parts: a fracture start groove 50 is formed on the approximate center, and notches are formed on both ends of the crank pin opening 35. The crank pin opening 35 is not provided with chamfers 53 at its edges.

The stress concentration factor of the notches 52 is smaller than that of the fracture start groove 50, so that the stress concentration at both ends of the inner surface of the crank pin opening 35 is alleviated and minimized. This results in the concentration of stress at the approximate center of the inner surface of the crank pin opening 35.

Thus, the fracture starts from the single point at the approximate center of the inner surface of the crank pin opening 35. As a result, the fracture advances from the single point at the approximate center of the inner surface of the crank pin opening 35, as shown by the arrows of FIG. 20.

In this case, a fracture plane is formed by the fracture from the approximate center of the inner surface of the crank pin opening 35. This causes the large end 30 to be fractured and separated into the rod 33 and the cap 34 along the single fracture plane, thereby preventing the formation of double cracks.

Other Preferred Embodiments

The bearing securing grooves 51 do not necessarily have to be formed in the structures of FIGS. 15, 18, 19, and 20. The chamfers 53 do not necessarily have to be formed in the structures of FIGS. 15, 18, and 19.

Still alternatively, a single bearing securing groove 51 may be formed on either or both the opposing positions on the inner surface of the crank pin opening 35, or three or more bearing securing grooves 51 may be formed thereon.

Figure 21:
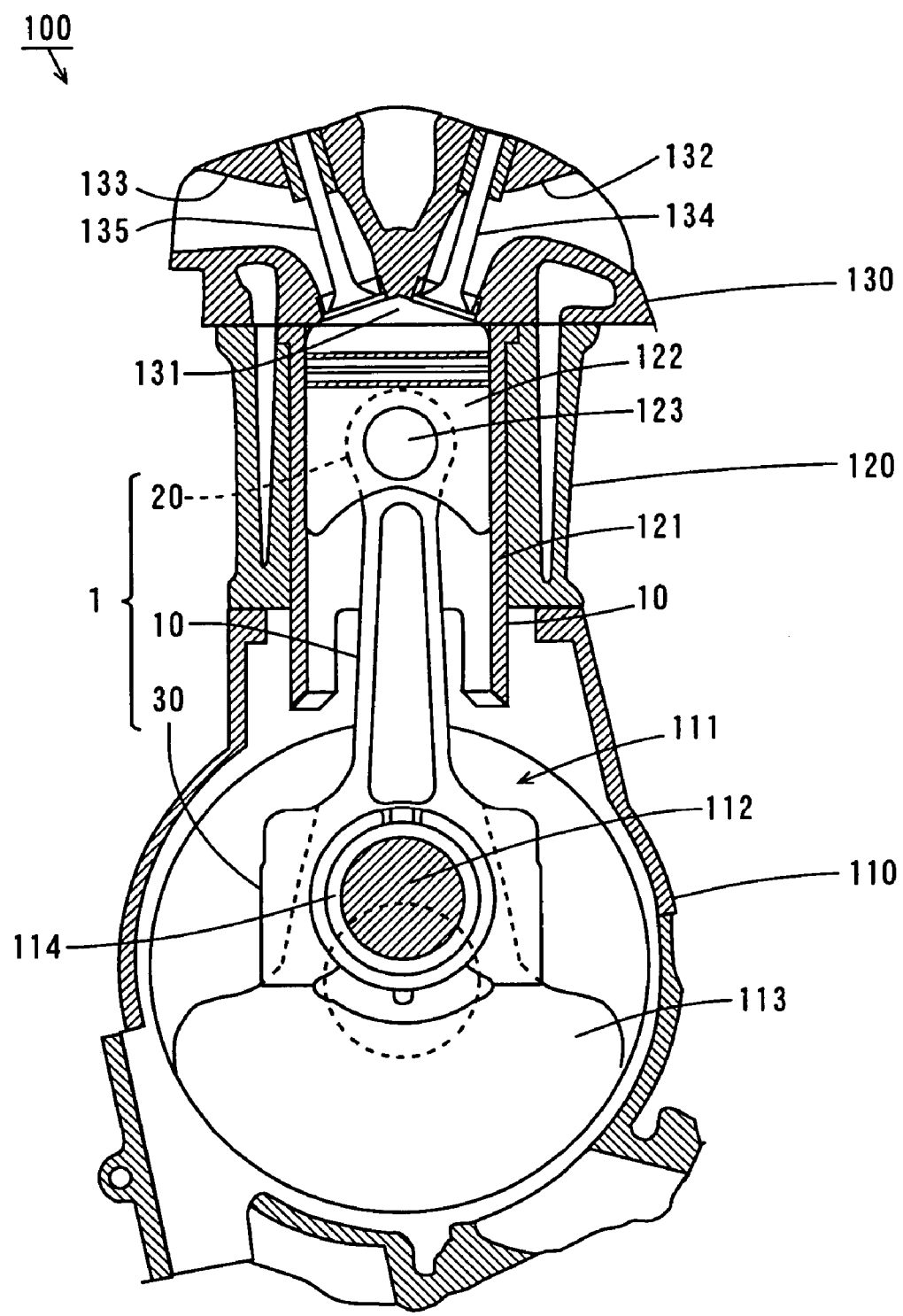
FIG. 21 is a cross-section view showing an example of an engine using the split connecting rod according to the foregoing preferred embodiment of the present invention.

FIG. 21 is a cross-section view showing an example of an engine including the slit connecting rod 1 according to a preferred embodiment of the present invention.

The engine 100 of FIG. 21 includes a crankcase 110, a cylinder block 120, and a cylinder head 130.

The crankcase 110 is provided with a crankshaft 111. The crankshaft 111 includes a crank pin 112 and a crankweb 113.

The cylinder block 120 is disposed above the crankcase 110. A cylindrical cylinder sleeve 121, where a piston 122 is reciprocatingly arranged in the axial direction, is mounted in the cylinder block 120. The piston 122 has a piston pin 123.

The piston pin 123 is inserted into the piston pin opening of the small end 20 of the split connecting rod 1. A crank pin 112 is inserted into the crank pin opening of the large end 30 of the split connecting rod 1 with a bearing metal 114 therebetween. The piston pin 123 and crank pin 112 are thus coupled to each other. The bearing metal 114 is secured in the bearing securing grooves 51 of FIG. 1 to FIG. 4.

A cylinder head 130 is disposed above the cylinder block 120. The cylinder block 120 and cylinder head 130 together define a combustion chamber 131. An intake port 132 and an exhaust port 133 are formed in the cylinder head 130. The intake port 132 has an intake valve 134 that is arranged to be openable at its lower-end opening, whereas the exhaust port 133 has an exhaust valve 135 that is openable at its lower-end opening.

In the engine 100 of FIG. 21, the crank pin opening 35 of the split connecting rod 1 according to a preferred embodiment described above has a high degree of roundness and cylindricality, so that friction losses are decreased, while seizing up of the engine is prevented. Moreover, upon assembly of the split connecting rod 1 into the engine, the damage to the engine parts due to pieces of broken metal is prevented. Thus, a high-performance, low-cost engine 100 is provided. Furthermore, the use of a very tough material for the split connecting rod 1 improves the engine 100 in tolerance.

Figure 22:
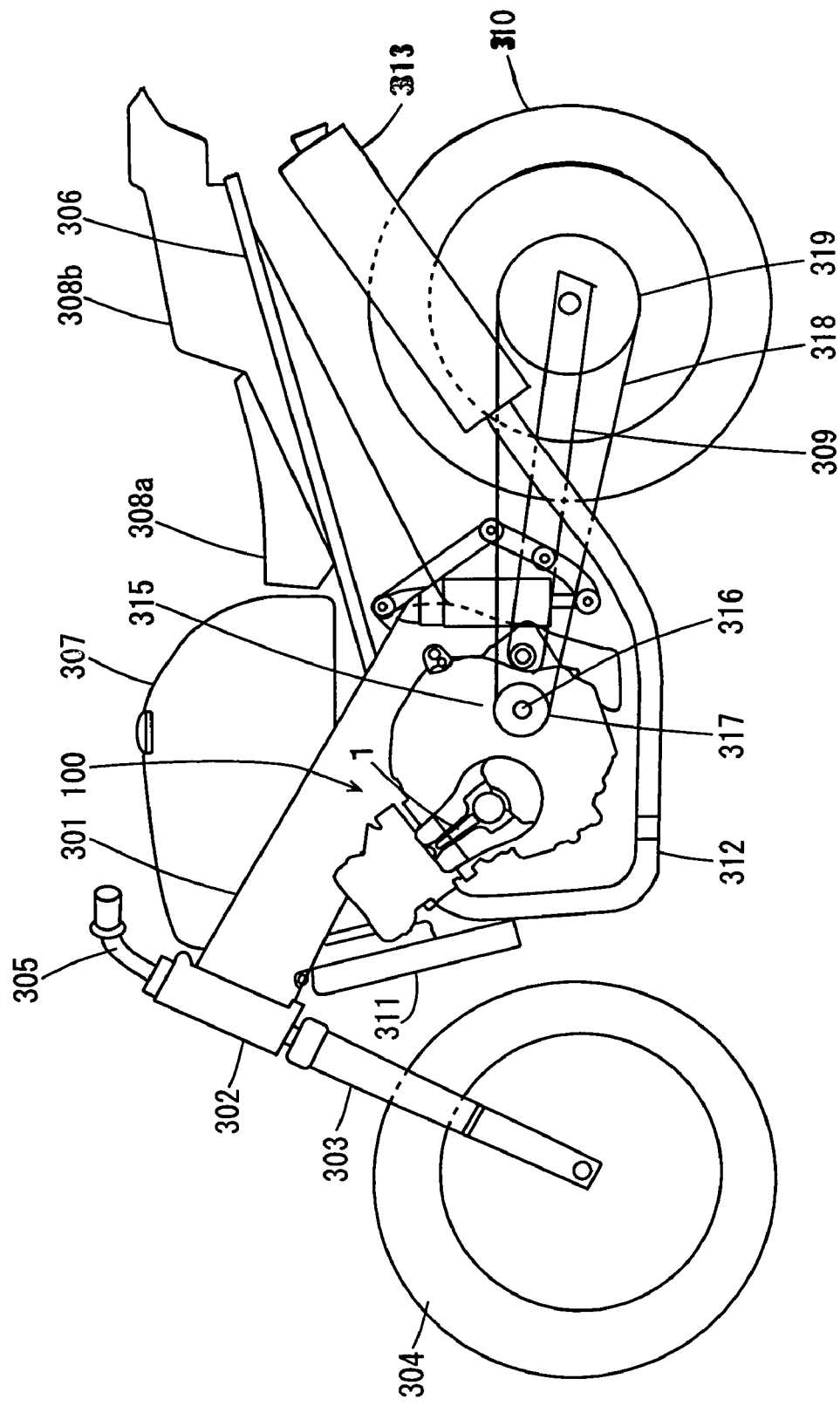
FIG. 22 is a schematic view of an automatic motorcycle using the engine of FIG. 21.

FIG. 22 is a schematic view of a motorcycle including the engine 100 of FIG. 21.

In the automatic motorcycle 100 of FIG. 22, a body frame 301 is provided with a head pipe 302 at its front end. The head pipe 302 is provided with a front fork 303 that can swing left and right. At the lower end of the front fork 303 is a front wheel 304 that is rotatably supported thereon. A handle 305 is mounted at the upper end of the head pipe 302.

A seat rail 306 is mounted to extend rearwardly from the upstream of the lower end of the body frame 301. A fuel tank 307 is provided above the body frame 301. A main seat 308a and a tandem seat 308b are provided on the seat rail 306.

A rear arm 309 is mounted to extend rearwardly from the rear end of the body frame 301. A rear wheel 310 is rotatably supported at the rear end of the rear arm 309.

The engine 100 of FIG. 21 is preferably held in the approximate center of the body frame 301. The engine 100 includes the split connecting rod 1 according to a preferred embodiment described above. A radiator 311 is mounted on the front side of the engine 100. The exhaust port of the engine 100 is connected with an exhaust pipe 312, which is in turn mounted to the muffler 313 at its rear end.

The engine 1 is coupled to a transmission 315. A drive sprocket 317 is mounted around a drive shaft 316 of the transmission 315. The drive sprocket 317 is coupled via a chain 318 to a rear-wheel sprocket 319 of a rear wheel 310. In the present preferred-embodiment, the transmission 315 and the chain 318 correspond to a transmission mechanism.

The motorcycle of FIG. 22 includes the engine 100 of FIG. 21 so as to offer reduced cost, higher performance, and improved tolerance.

Note that the split connecting rod 1 according to a preferred embodiment described above and the engine 100 including the same may find applications in various vehicles other than a motorcycle, such as a four-wheel car.

Although the present invention has been described and illustrated in detail with reference to certain preferred embodiments thereof, it is clearly understood that the same is by way of illustration and example only and is not to be taken by way of limitation, the spirit and scope of the present invention being limited only by the terms of the appended claims.

What is claimed is:

1. A split connecting rod comprising:
   a rod body;
   a small end; and
   a large end having an opening integrally provided at one end of said rod body; wherein a fracture start groove is formed on each of opposing positions on an inner surface of said opening and at one portion of a line extending along an axial direction of said opening such that the fracture start groove has a greater stress concentration factor than another portion of the line extending along the axial direction of said opening, said large end being separated by fracture separation along said fracture start groove; and said fracture start groove is formed at an approximate center of each line extending along the axial direction on the inner surface of said opening.

2. The split connecting rod according to claim 1, wherein at least one notch having a curved bottom surface is formed at a region intersecting with said another portion of each line extending along the axial direction on the inner surface of said opening, said at least one notch having a stress concentration factor that is smaller than that of said fracture start groove.

3. The split connecting rod according to claim 1, wherein an inside of said rod body and said large end is made of a steel having a carbon content of not less than about 0.05 wt % and not more than about 0.45 wt %, a surface layer of said rod body and said large end having a carbon content that is higher than the inside thereof.

4. A split connecting rod comprising:
a rod body;
a small end; and
a large end having an opening integrally provided at one end of said rod body; wherein
a fracture start groove is formed on each of opposing positions on an inner surface of said opening and at one portion of a line extending along an axial direction of said opening such that the fracture start groove has a greater stress concentration factor than another portion of the line extending along the axial direction of said opening, said large end being separated by fracture separation along said fracture start groove; and
at least one bearing securing groove having a curved bottom surface is formed at least one region that intersects with said another portion of the line extending along the axial direction on at least one of said opposing positions on the inner surface of said opening, said at least one bearing securing groove having a stress concentration factor that is smaller than that of said fracture start groove.

5. The split connecting rod according to claim 4, wherein said at least one bearing securing groove includes a first bearing securing groove and a second bearing securing groove, said fracture start groove being formed between said first bearing securing groove and said second bearing securing groove.

6. A method of manufacturing a split connecting rod comprising the steps of:
forming a connecting rod including a rod body, a small end, and a large end having an opening integrally provided at one end of the rod body;
forming, on each of opposing positions on an inner surface of said opening, a fracture start groove at one portion of a line extending along the axial direction of said opening to have a greater stress concentration factor than another portion of the line extending along the axial direction of said opening; and
separating said large end by fracture separation along said fracture start groove; wherein
the step of forming said fracture start groove includes the step of forming said fracture start groove at an approximate center of each line extending along the axial direction on the inner surface of said opening.

7. The method of manufacturing a split connecting rod according to claim 6, further comprising the step of forming, prior to the step of separating said large end by fracture separation, at least one notch having a curved bottom surface at a region intersecting with said another portion of each line extending along the axial direction on the inner surface of said opening, said at least one notch having a stress concentration factor that is smaller than that of said fracture start groove.

8. The method of manufacturing a split connecting rod according to claim 6, wherein the step of forming said rod body and said large end includes the step of forming said rod body and said large end of a steel having a carbon content of not less than about 0.05 wt % and not more than about 0.45 wt %.

9. The method of manufacturing a split connecting rod according to claim 8, wherein the step of forming said rod body and said large end further includes the step of performing a surface hardening process so that a surface layer of said rod body and said large end has a carbon content that is greater than an inside thereof.

10. The method of manufacturing a split connecting rod according to claim 6, wherein the step of forming said fracture start groove includes the step of forming said fracture start groove by a wire-cut electrical discharge machining.

11. A method of manufacturing a split connecting rod comprising the steps of:
forming a connecting rod including a rod body, a small end, and a large end having an opening integrally provided at one end of the rod body;
forming, on each of opposing positions on an inner surface of said opening, a fracture start groove at one portion of a line extending along the axial direction of said opening to have a greater stress concentration factor than another portion of the line extending along the axial direction of said opening;
separating said large end by fracture separation along said fracture start groove; and
forming, prior to the step of separating said large end by fracture separation, on at least one of said opposing positions on the inner surface of said opening, at least one bearing securing groove having a curved bottom surface at at least one region intersecting with said another portion of the line extending along the axial direction on the inner surface of said opening, said at least one bearing securing groove having a stress concentration factor that is smaller than that of said fracture start groove.

12. The method of manufacturing a split connecting rod according to claim 11, wherein the step of forming said at least one bearing securing groove includes the step of forming, on at least one of said opposing positions on the inner surface of said opening, first and second bearing securing grooves at first and second regions intersecting with said another portion of the line extending along the axial direction on the inner surface of said opening, and the step of forming said fracture start groove including the step of forming said fracture start groove between said first region and said second region.

13. An engine comprising:
a cylinder;
a piston arranged to move in a reciprocating manner in said cylinder;

a piston pin provided on said piston;
a crankshaft arranged to rotate;
a crank pin provided in said crankshaft; and
a split connecting rod that joins said piston pin and said crank pin; wherein said split connecting rod includes:
 a rod body;
 a large end integrally provided at a first end of said rod body, and having a first opening into which said crank pin is inserted; and
 a small end integrally provided at a second end of said rod body, and having a second opening into which said piston pin is inserted; wherein
 a fracture start groove located on each of opposing positions on an inner surface of said first opening such that one portion of a line extending along an axial direction of said first opening has a greater stress concentration factor than another portion of the line extending along the axial direction of said first opening, and said large end being separated by fracture separation along said fracture start groove; and
 said fracture start groove is formed at an approximate center of each line extending along the axial direction on the inner surface of said opening.

14. A vehicle comprising:
an engine that generates power;
a drive wheel; and
a transmission mechanism that transmits the power generated by said engine to said drive wheel; wherein said engine includes:
a cylinder;
a piston arranged to move in a reciprocating manner in said cylinder;
a piston pin provided on said piston;
a crankshaft arranged to rotate;
a crank pin provided in said crankshaft; and
a split connecting rod that joins said piston pin and said crank pin; wherein said split connecting rod includes:
 a rod body;
 a large end integrally provided at a first end of said rod body, and having a first opening into which said crank pin is inserted;
 a small end integrally provided at a second end of said rod body, and having a second opening into which said piston pin is inserted; wherein
 a fracture start groove located on each of opposing positions on an inner surface of said first opening such that one portion of a line extending along an axial direction of said first opening has a greater stress concentration factor than another portion of the line extending along the axial direction of said first opening, and said large end being separated by fracture separation along said fracture start groove; and
 said fracture start groove is formed at an approximate center of each line extending along the axial direction on the inner surface of said opening.

\* \* \* \* \*